United States Patent
Wang et al.

(10) Patent No.: US 9,690,710 B2
(45) Date of Patent: *Jun. 27, 2017

(54) SYSTEM AND METHOD FOR IMPROVING A VICTIM CACHE MODE IN A PORTABLE COMPUTING DEVICE

(71) Applicant: QUALCOMM INCORPORATED, San Diego, CA (US)

(72) Inventors: Feng Wang, San Diego, CA (US); Bohuslav Rychlik, San Diego, CA (US); Moinul Khan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/598,049

(22) Filed: Jan. 15, 2015

(65) Prior Publication Data

US 2016/0210239 A1    Jul. 21, 2016

(51) Int. Cl.
*G06F 12/00* (2006.01)
*G06F 12/0888* (2016.01)
(Continued)

(52) U.S. Cl.
CPC ...... *G06F 12/0888* (2013.01); *G06F 12/0811* (2013.01); *G06F 12/0833* (2013.01);
(Continued)

(58) Field of Classification Search
CPC ............ G06F 12/0897; G06F 12/126; G06F 12/0811; G06F 12/0842; G06F 12/0866;
(Continued)

(56) References Cited

U.S. PATENT DOCUMENTS

| 7,430,639 B1 | 9/2008 | Bali et al. |
| 7,711,902 B2 | 5/2010 | Pong |

(Continued)

FOREIGN PATENT DOCUMENTS

WO    0227498 A2    4/2002

OTHER PUBLICATIONS

Mrinmoy Gosh et al., Way Guard: A Segmented Counting Bloom Filter Approach to Reducing Energy for Set-Associative Caches, Aug. 19-21, 2009, ISLPED'09, Location: San Francisco, California, USA; pp. No. 165-170.

(Continued)

*Primary Examiner* — Mardochee Chery
(74) *Attorney, Agent, or Firm* — Smith Tempel Blaha LLC

(57) ABSTRACT

Systems and methods for improved operation of a victim cache in a portable computing device (PCD) are presented. A lower level cache is operated as a victim to an upper level cache, the lower level cache containing a plurality of cache lines. A filter is operated in association with the lower level victim cache, and reflects the cache lines contained in the victim cache. For a miss at the upper level cache, the filter is checked to determine if the requested cache line is in the victim cache. If checking the filter determines that the requested cache line is in the victim cache the requested cache line is retrieved from the victim cache. If checking the filter determines that the request cache line is not in the victim cache, the victim cache is bypassed and the cache line is requested from a memory controller.

19 Claims, 11 Drawing Sheets

(51) Int. Cl.
  *G06F 12/0811* (2016.01)
  *G06F 12/0831* (2016.01)
  *G06F 12/0868* (2016.01)

(52) U.S. Cl.
  CPC ...... *G06F 12/0835* (2013.01); *G06F 12/0868* (2013.01); *G06F 2212/283* (2013.01); *G06F 2212/6046* (2013.01); *G06F 2212/62* (2013.01)

(58) Field of Classification Search
  CPC ........... G06F 2212/283; G06F 12/0868; G06F 12/0888; G06F 2212/6012; G06F 2212/604; G06F 2212/6046; G06F 2212/62
  USPC ........................................................ 711/122
  See application file for complete search history.

(56) References Cited

U.S. PATENT DOCUMENTS

| | | | | |
|---|---|---|---|---|
| 8,099,556 | B2* | 1/2012 | Ghosh | G06F 9/383 |
| | | | | 711/122 |
| 8,788,757 | B2 | 7/2014 | Daly et al. | |
| 9,244,793 | B1 | 1/2016 | Brown et al. | |
| 2007/0094450 | A1 | 4/2007 | VanderWiel | |
| 2010/0153646 | A1 | 6/2010 | Chen et al. | |
| 2012/0017041 | A1 | 1/2012 | Zwisler | |
| 2013/0111136 | A1* | 5/2013 | Bell, Jr. | G06F 12/08 |
| | | | | 711/122 |
| 2013/0138894 | A1 | 5/2013 | Loh et al. | |
| 2013/0145104 | A1 | 6/2013 | Hsu | |
| 2014/0006698 | A1* | 1/2014 | Chappell | G06F 12/0842 |
| | | | | 711/105 |
| 2014/0143505 | A1 | 5/2014 | Sim et al. | |
| 2014/0181421 | A1 | 6/2014 | O'Connor et al. | |
| 2016/0210230 | A1 | 7/2016 | Wang | |

OTHER PUBLICATIONS

Basu A., et al., "Scavenger: A New Last Level Cache Architecture with Global Block Priority", Microarchitecture, 2007, Micro 2007, 40th Annual IEEE/ACM International Symposium on, IEEE, Piscataway, NJ, USA, Dec. 1, 2007, pp. 421-432, XP031194159, ISBN: 978-0-7695-3047-5.

Chaudhuri M., et al., "Introducing Hierarchy-awareness in Replacement and Bypass Algorithms for Last-level Caches," International Conference on Parallel Architectures and Compilation Techniques (PACT), 2012, 12 pages.

International Search Report and Written Opinion—PCT/US2016/012745 ISA/EPO—Apr. 8, 2016.

Zhang M., et al., "Victim Migration: Dynamically Adapting Between Private and Shared CMP Caches," 2005, 17 pages.

Stiliadis D., et al., "Selective Victim Caching: A Method to Improve the Performance of Direct-Mapped Caches", IEEE Transactions on Computers, IEEE Service Center, Los Alamitos, CA, US, vol. 46, No. 5, May 1, 1997 (May 1, 1997), pp. 603-610, XP000692631, ISSN: 0018-9340, DOI: 10.1109/12.589235.

* cited by examiner

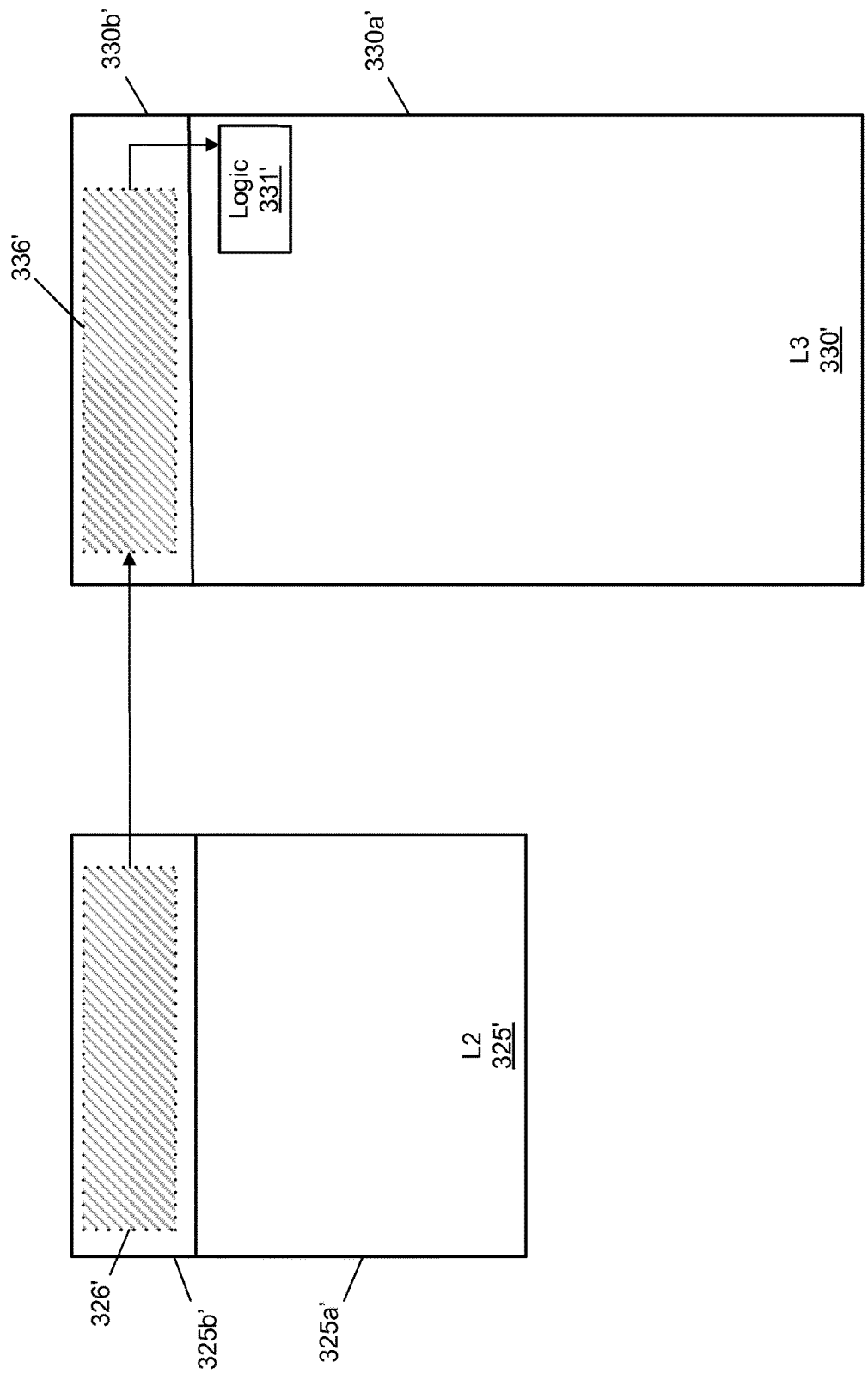

SYSTEM AND METHOD FOR IMPROVING A VICTIM CACHE MODE IN A PORTABLE COMPUTING DEVICE

DESCRIPTION OF THE RELATED ART

Devices with a processor that communicate with other devices through a variety of communication media, including wireless signals, are ubiquitous. Mobile devices including portable computing devices (PCDs) may be used to communicate with a variety of other devices via wireless, analog, digital and other means. These mobile devices may include mobile phones, portable digital assistants (PDAs), portable game consoles, palmtop computers, tablet computers and other portable electronic devices.

In addition to the primary function, PCDs may also be used for downloading and playing games; downloading and playing music; downloading and viewing video; global positioning system (GPS) navigation, web browsing, and running applications. To accommodate these ever-growing uses and demands for higher performance, modern PCDs typically include one or more cores (e.g., processing units) for controlling or performing varying functions of the PCD. These PCDs may also include cache memories arranged in a hierarchal fashion in differing levels, that may be shared by multiple cores or processing units over a bus or interconnect.

In an effort to improve the performance of such hierarchal cache memories a larger capacity lower level cache memory with slower access times may be operated as a "victim" cache to a lower capacity upper level cache memory with faster access times. In such arrangements, the lower level "victim" cache in the hierarchy is exclusive to and entirely populated by the upper level cache as cache lines are removed or "evicted" from the upper level cache. For example, a processor may fetch data from an upper level L2 cache. If the data is in the L2 cache a "hit" occurs and the data is provided to the processor. If the data is not in the L2 cache a "miss" occurs and the requested data is retrieved from elsewhere. The requested data is also placed in the L2 cache, replacing an existing cache line in the L2 cache. The existing L2 cache line is removed or evicted to the lower level victim cache, such as an L3 cache, according to a replacement policy However, such "victim" cache systems may incur extra bandwidth and power consumption by the cache memories that are not justified by any gains from the operating the lower level cache as a "victim" cache. Thus, there is a need for systems and methods for adaptive implementation of victim cache modes. Additionally, when operating in "victim" mode, the physical arrangement of the cache memories themselves may lead to increased latency due to the circuitous route data may take between the caches. Thus, there is also a need for systems and methods of improved operation of the caches in victim modes.

SUMMARY OF THE DISCLOSURE

Systems and methods are disclosed that allow for improved operation of a victim cache in a portable computing device (PCD). In operation, a lower level cache is operated as a victim to an upper level cache, the lower level cache containing a plurality of cache lines. A filter is operated in association with the lower level victim cache, and the filter is updated to reflect the plurality of cache lines contained in the lower level victim cache. In the event of a miss at the upper level cache, a determination is made whether a requested cache line is one of the plurality of cache lines contained in the lower level cache by checking the filter associated with the lower level victim cache. If the determination is that the requested cache line is one of the plurality of cache lines contained in the lower level cache, the requested cache line is retrieved from the lower level victim cache. If the determination is that the requested cache line is not one of the plurality of cache lines contained in the lower level cache, the lower level victim cache is bypassed and the cache line is requested from a memory controller in communication with the upper level cache.

One example embodiment is a computer system for a system-on-a-chip (SoC) in a portable computing device (PCD), the system comprising: an upper level cache; a lower level cache in communication with the upper level cache, the lower level cache configured to operate as a victim to the upper level cache, and the lower level containing a plurality of cache lines; a filter in communication with the lower level victim cache, wherein the filter is configured to reflect the plurality of cache lines contained in the lower level victim cache; and logic configured to: determine whether a requested cache line is one of the plurality of cache lines contained in the lower level cache in the event of a miss at the upper level cache by checking the filter associated with the lower level victim cache; and if the determination is that the requested cache line is one of the plurality of cache lines contained in the lower level cache, causing the requested cache line to be retrieved from the lower level victim cache, and if the determination is that the requested cache line is not one of the plurality of cache lines contained in the lower level cache, bypass the lower level victim cache and request the cache line from a memory controller in communication with the upper level cache Another example embodiment is a computer program product comprising a non-transitory computer usable medium having a computer readable program code embodied therein, said computer readable program code adapted to be executed to implement a method for improved operation of a victim cache in a portable computing device (PCD), the method comprising: operating a lower level cache as a victim to an upper level cache, the lower level cache containing a plurality of cache lines; operating a filter in association with the lower level victim cache; updating the filter to reflect the plurality of cache lines contained in the lower level victim cache; determining whether a requested cache line is one of the plurality of cache lines contained in the lower level cache in the event of a miss at the upper level cache, wherein the determining comprises checking the filter associated with the lower level victim cache; and if the determination is that the requested cache line is one of the plurality of cache lines contained in the lower level cache, retrieving the requested cache line from the lower level victim cache, and if the determination is that the requested cache line is not one of the plurality of cache lines contained in the lower level cache, bypassing the lower level victim cache and requesting the cache line from a memory controller in communication with the upper level cache.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures. Similarly, for reference numerals with ' designations, such as 102', the ' designation may designate an alternative embodiment for the underlying element with the same reference numerals (but without the ' designation).

FIG. 3B is a block diagram of illustrating details of another exemplary embodiment of the cache memories in the exemplary system of FIG. 2;

DETAILED DESCRIPTION

Figure 1:
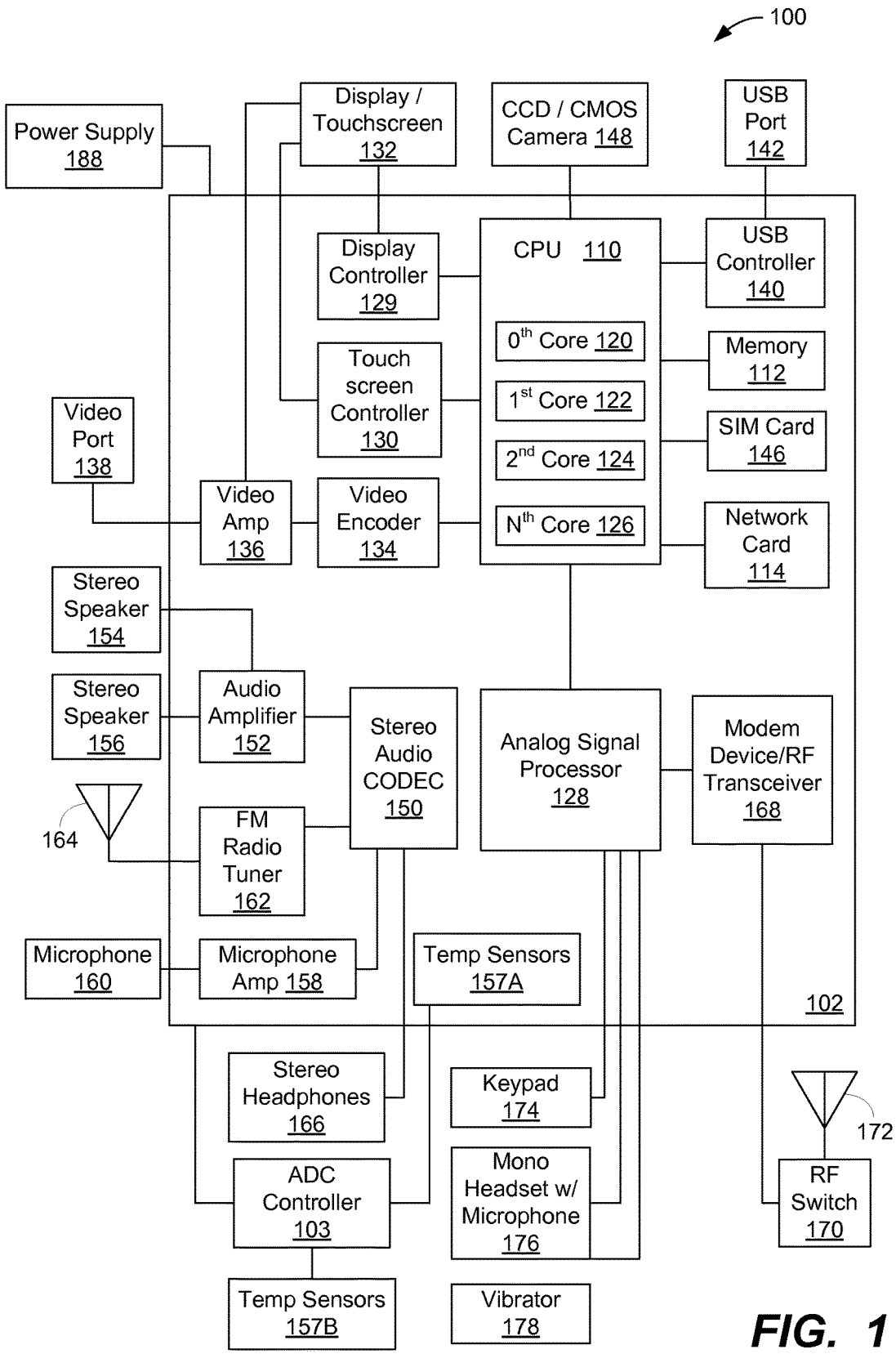
FIG. 1 is a block diagram of an example embodiment of a portable computing device (PCD) in which the present invention may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that may be implemented on an SoC. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" may be used interchangeably and generally directed toward the processing burden, or percentage of processing burden, that is associated with, or may be assigned to, a given processing component in a given embodiment. Additionally, the related terms "frame," "code block" and "block of code" may be used interchangeably to refer to a portion or segment of a given workload. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for adaptive implementation of victim cache modes and improved operation of the cache memories during a victim mode in a PCD provide a cost effective way to dynamically implement a victim cache when the architecture, workload, operating conditions, etc., of the PCD dictate that operation in the victim cache mode is desirable, such as to increase the effective size of a data cache for data intensive workloads and/or applications. Additionally, the present systems and methods provide for improved operation of the cache memories when operating in the victim cache mode. Alternatively, the present systems and methods for adaptive implementation of victim cache modes in a PCD allow for the victim cache mode to be dynamically turned off when the workload, architectures, operating conditions, etc., indicate that the benefits of operating in the victim cache mode are not being fully realized or outweighed by the additional costs in terms of memory bandwidth, power consumption, etc. caused by operation in the victim cache mode.

The systems described herein, including the systems for adaptive implementation of victim cache modes in a PCD and for improved operation of the cache memories in the victim mode, or portions of the system, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a PCD or other system described herein is implemented, or partially implemented, in software, the software portion can be used to perform various steps of the methods described herein. The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a block diagram of an exemplary, non-limiting aspect of a PCD 100 that may implement the systems and methods described herein. The PCD 100 illustrated in FIG. 1 is in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1x, Evolution-Data Optimized (EVDO), Time Division Synchronous CDMA (TD-SCDMA), or some other version of CDMA.

As shown, the PCD 100 includes an on-chip system (or SoC) 102 that includes a heterogeneous multi-core central processing unit ("CPU") 110 and an analog signal processor 128 that are coupled together. The CPU 110 may comprise a zeroth core 120, a first core 122, second core 124, and an Nth core 126 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 120, 122, 124, 126 may process workloads at different efficiencies under similar operating conditions. Each of the cores 120, 122, 124, 126 may control one or more function of the PCD 100. For example, the zeroth core 120 may be a graphics processing unit (GPU) for controlling graphics in the PCD 100. Such GPU/zeroth core 120 may further include drivers and/or other components necessary to control the graphics in the PCD 100, including controlling communications between the GPU core 120 and memory 112 (including buffers). For another example, a different core such as the Nth core 126 may run the PCD operating system, such as a high-level operating system (HLOS). Such Nth/HLOS core 126 may further include drivers, hardware interfaces, and/or other components necessary to run the HLOS, including communications between the core 126 and memory 112 (which may include flash memory).

Any of the cores 120, 122, 124, 126 may be a separate processor such as a CPU or a digital signal processor. Additionally, each of the cores may be functionally grouped together with other components, such as memory 112, sensors, or other hardware of the PCD 100 to form a subsystem as described below. Such subsystem(s) may be implemented in order to perform certain functionality of the PCD, such as an audio subsystem, a GPS subsystem, a sensor subsystem, etc. One or more of such subsystems may also be configured to operate independently of the SoC 102, such as to continue operation when the SoC 102 has been placed into a low or reduced power state or mode, including a power off state or mode.

Additionally, one or more of the cores 120, 122, 124, 126 may include, in addition to a processor, other components such as one or more cache memories. These cache memories may include a dedicated cache memory for a particular core, such as for example an L1 cache. Additionally, or alternatively these cache memories may include a cache memory that is shared with and/or accessible by other cores or processors, such as for example an L2 cache.

A memory 112 is also illustrated as coupled to the multicore CPU 110. Such memory 112 may for example be random access memory (RAM), read only memory (ROM), flash memory, or any combination thereof. Additionally, the memory 112 may comprise multiple different types of memory located together or located remotely from each other, including buffers, main memories, and caches. Such caches could include one or more L3 caches that may be accessed by one or more of the cores 120, 122, 124, 126. Additionally, although the memory 112 is illustrated as located on the SoC 102, the memory 112 may include one or more memories located physically remote from the SoC 102, such as a DDR memory in communication with the multicore CPU 110 and/or one or more of the cores 120, 122, 124, 126.

As illustrated in FIG. 1, a display controller 129 and a touch screen controller 130 are coupled to the multicore CPU 110. In turn, a display/touchscreen 132, external to the on-chip system 102, is coupled to the display controller 129 and the touch screen controller 130. A digital camera 148 may also be coupled to the multicore CPU 110. In such embodiments, the digital camera 148 may be controlled by one of the cores 120, 122, 124, 126 of the multicore CPU 110. In an exemplary aspect, the digital camera 148 is a charge-coupled device (CCD) camera or a complementary metal-oxide semiconductor (CMOS) camera The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus (USB) controller 140 is coupled to the multicore CPU 110. Also, a USB port 142 is coupled to the USB controller 140. A subscriber identity module (SIM) card 146 may also be coupled to the multicore CPU 110. In other embodiments, multiple SIM cards 146 may be implemented.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip and include its own processor and/or core that may be monitored by the systems and methods described herein. Alternatively, various components comprising the modem device 168 may be coupled to the multicore CPU 110 and controlled by one of the cores 120, 122, 124 of the CUP 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 128. Also, a mono headset with a microphone 176 may be coupled to the multicore CPU 110 and or analog signal processor 128. Further, a vibrator device 178 may also be coupled to the multicore CPU 110 and/or analog signal processor 128. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the disclosure.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the SoC 102.

The SoC 102 may also include various buses and/or interconnects (not shown) to communicatively couple the multicore CPU 110 and/or one or more of the cores 120, 122, 124, 126 with other subsystems or components of the SoC 102 or PCD 100. It should be understood that any number of bus and/or interconnect controllers may also be implemented and arranged to monitor a bus/interconnect interface in the on-chip system 102. Alternatively, a single bus/interconnect controller could be configured with inputs arranged to monitor two or more bus/interconnect interfaces that communicate signals between CPU 110 and various subsystems or components of the PCD 100 as may be desired.

In a particular aspect, one or more of the method steps described herein may be enabled via a combination of data and processor instructions stored in the memory 112 and/or a memory located on the CPU 110. These instructions may be executed by one or more cores 120, 122, 124, 126 in the multicore CPU 110 and/or subsystems of the SoC 102 in order to perform the methods described herein. Further, the multicore CPU 110, one or more of the cores 120, 122, 124, 126, the memory 112, other components of the PCD 100, or a combination thereof may serve as a means for executing one or more of the method steps described herein in order enable adaptive implementation of victim cache modes and/or improved operation of the caches while in victim modes.

Figure 2:
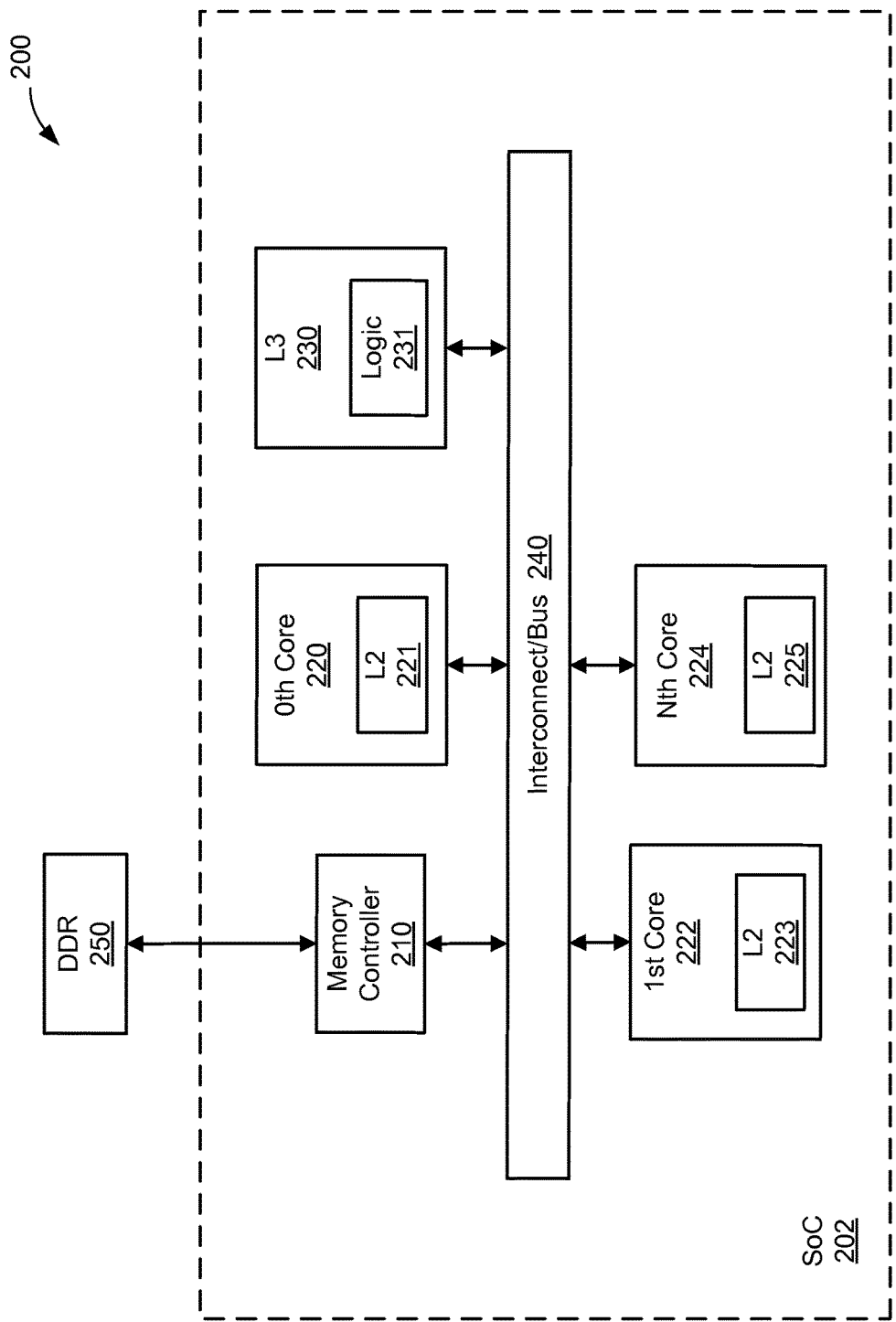
FIG. 2 is a block diagram showing an exemplary embodiment of a system for adaptive implementation of victim cache modes in a PCD, such as the PCD embodiment illustrated in FIG. 1.

FIG. 2 is a block diagram showing an exemplary embodiment of a system 200 for adaptive implementation of victim cache modes in a PCD, such as the PCD 100 embodiment illustrated in FIG. 1. FIG. 2 illustrates the exemplary system 200 including a system-on-a-chip (SoC) integrated circuit 202, which could be implemented in a PCD (similar to the SoC 102 in FIG. 1). The SoC 202 of FIG. 2 includes a Memory Controller 210, 0th Core 220, 1st Core 222, Nth Core 224, and L3 cache 230 all connected to an interconnect or bus 240 of the SoC 202. The interconnect/bus 240 of the SoC 202 may be any desired type of bus or interconnect which may depend on the architecture of the SoC 202 and/or the uses for which the SoC 202 or PCD are intended.

As illustrated in the embodiment of FIG. 2, the Memory Controller 210 is in communication with the interconnect/bus 250 and also in communication with a memory external to the SOC 202, DDR 250. Memory Controller 210 may control access to various memories of the SoC 202 including L3 cache 230, and also may allow the various components of the SoC 202, including 0th Core 220, 1st Core 222 and Nth Core 224, to access the external DDR 250 memory when the SoC 202 is powered up and/or in a functional state or mode.

The SoC 202 may also include other components and/or sub-systems (including those illustrated in FIG. 1) which are not shown in FIG. 2 for clarity. Each of 0th Core 220, 1st Core 222 and Nth Core 224 will include a processor of some type, and each may be implemented as one of the cores 120, 122, 124, 126 discussed above for FIG. 1. In some embodiments, the processor of one or more of the 0th Core 220, 1st Core 222 and Nth Core 224 could be implemented as a general purpose processing unit, while in other embodiments the processor(s) may be implemented as a dedicated processor, such as a DSP. Each of 0th Core 220, 1st Core 222 and Nth Core 224 also includes at least one cache memory, illustrated in the FIG. 2 as the L2 cache 221 (for 0th Core 220) L2 cache 223 (for 1st Core 222), and L2 cache 225 (for Nth Core 224).

In various embodiments, one or more of 0th Core 220, 1st Core 222 and Nth Core 224 may include more or less components than illustrated in FIG. 2, such as additional L1 cache(s). Additionally, in some embodiments, the components illustrated in FIG. 2 may be physically arranged on the SoC 202 in varying configurations and one or more components illustrated in FIG. 2 may not be physically located near each other on the SoC 202.

In the embodiment illustrated in FIG. 2, the L2 caches 221, 223, 225, the L3 cache 230, and the DDR 250 may be organized in a hierarchy where the L2 caches 221, 223, 225 represent the smallest data capacity but fastest performance/lowest latency, the L3 cache 230 having a larger data capacity, but slower performance/higher latency than the L2 caches 221, 223, 225, and the DDR 250 having the largest data capacity and slowest performance/highest latency. In this embodiment, the L3 cache 230 is a lower level cache than the L2 caches 221, 223, 225. Additionally, in the illustrated embodiment, the L3 cache 230 may be operated either as an independent cache that may be directly accessed by any of able by any 0th Core 220, 1st Core 222 and Nth Core 224 ("normal mode"), or the L3 cache 230 may be a victim cache for one or more of the higher level L2 caches 221, 223, 225 ("victim mode"). As described below the operation of the L3 cache 230 in normal mode or victim mode may be dynamically determined and/or set and subsequently changed during the operation of the PCD.

When the L3 cache 230 is operating in victim mode to one or more of the L2 caches 221, 223, 225, the effective cache size/capacity for the core 220, 222, 224 is increased by use of cache line castout from the higher level L2 cache 221, 223, 225 to the lower level L3 cache 230, theoretically decreasing the number of cache misses by the 0th Core 220, 1st Core 222 and/or Nth Core 224. However, by virtue of the L3 cache 230 being the victim cache, it is only populated by the cache lines evicted from the higher-level L2 cache 221, 223, 225 which requires includes both clean and dirty cache line castouts from the L2 cache 221, 223, 225. This in turn results in additional castout and castout bandwidth at the L3 230 cache (and associated increased power consumption) to make room for the additional dirty and clean cache line castouts from the L2 cache 221, 223, 225 (as opposed to the normal mode when only dirty cache lines are evicted).

When the L3 cache 230 is operating in the normal mode, the effective cache size/capacity for the core 220, 222, 224 is not increased as discussed above, theoretically increasing the number of cache misses by the 0th Core 220, 1st Core 222 and/or Nth Core 224, which in turn increases the latency from having to retrieve the data from a main memory such as DDR 250. However, the reduced castout to (and from) the L3 cache 230 results in lower bandwidth usage at the L3 cache (and associated decreased power consumption).

Figure 3A:
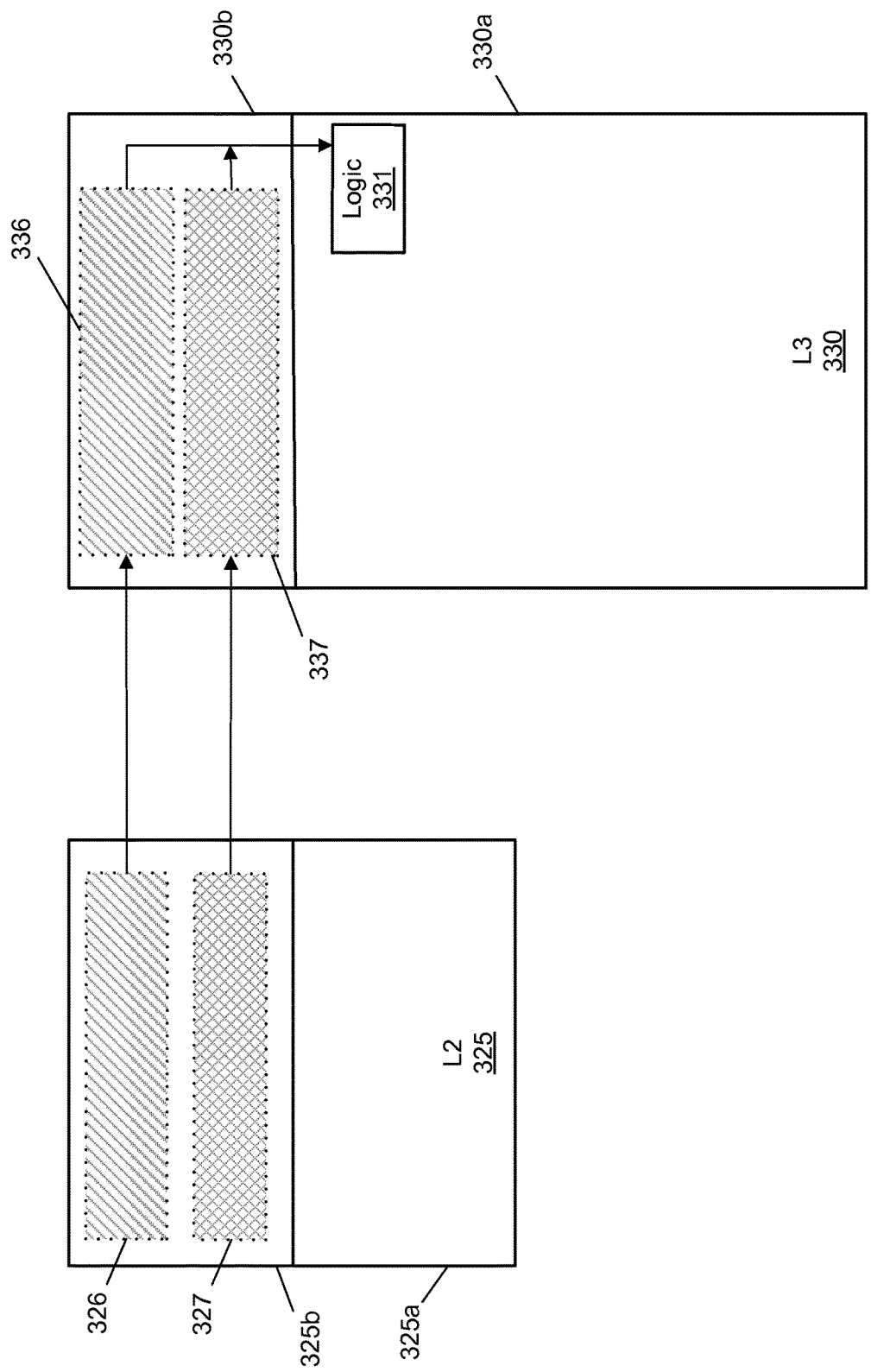
FIG. 3A is a block diagram illustrating details of an exemplary embodiment of the cache memories in the exemplary system of FIG. 2.

Turning to FIG. 3A, details of an exemplary embodiment of the cache memories in the exemplary system of FIG. 2 are illustrated. FIG. 3A illustrates aspects of an L2 cache 325 that corresponds to the L2 cache 225 of the Nth Core 224 shown in FIG. 2. Similarly, FIG. 3A illustrates aspects of an L3 cache 330 that corresponds to the L3 cache 230 shown in FIG. 2. Although FIG. 3A only illustrates one L2 cache 325, the principles are equally applicable to the additional L2 caches 221, 223 illustrated in FIG. 2.

As shown in FIG. 3A, the L2 cache 325 is divided into a first main portion 325a containing the regular sets of cache data lines, and a second sample portion 325b containing sample sets of L2 data. The illustrated second portion 325b of the embodiment of FIG. 3A is further subdivided into victim mode sample sets of L2 data 326 and normal mode sample sets of L2 data 327, effectively partitioning the L2 cache 325 into three data sets.

Similarly, the L3 cache 330 is also partitioned into a first main portion 330a containing the regular sets of cache data lines, and a second sample portion 330b containing sample sets of L3 data. The illustrated second portion 330b of the embodiment of FIG. 3A is further subdivided into victim mode sample sets of L3 data 336 and normal mode sample sets of L3 data 337, effectively partitioning the L3 cache 330 into three data sets. The victim mode sample sets of L3 data 336 and normal mode sample sets of L3 data 337 are both in communication with logic 331 of the L3 cache 330. The logic 331 of the L3 cache 330 corresponds with the logic 231 of L3 cache 230 show in FIG. 2A. Note that although illustrated as part of the L3 cache 230/330, the logic 231/331 may be a separate hardware, firmware, or software component in communication with the L3 cache 230/330, the victim mode sample sets of L3 data 336 and normal mode sample sets of L3 data 337, and/or the L2 cache 225/325.

In operation, regardless of whether the L3 cache 330 is operating in a normal mode or in a victim mode to the L2 cache 325, the second sample portion 325b of the L2 cache 325 will generate both victim mode sample sets of L2 data 326 and normal mode samples sets of L2 data 327. This generation of sample L2 data will result in corresponding victim mode sample sets of L3 data 336 and normal mode sample sets of L3 data 337 being generated in the sample portion 330b of the L3 cache 330. During a sampling period, the logic 331 associated with the L3 cache 330 will dynamically determine based on the generated victim mode sample sets of L3 data 336 and normal mode sample sets of L3 data 337 whether the L3 cache 330 should be operated in a victim mode as a victim to the L2 cache 325, or whether the L3 cache 330 should be operated independently in a normal mode.

In an embodiment, the L2 cache 325 will continuously generate the victim mode sample sets of L2 data 326 and normal mode samples sets of L2 data 327, and the resulting victim mode sample sets of L3 data 336 and normal mode sample sets of L3 data 337 will be continuously generated in the L3 cache 330 such that it may be read or otherwise received by the logic 331 during sampling period. In other embodiments, the L2 cache 325 will only generate the victim mode sample sets of L2 data 326 and normal mode samples sets of L2 data 327 (and cause the generation of the resulting victim mode sample sets of L3 data 336 and normal mode sample sets of L3 data 337 in the L3 cache 330) during the sampling period of the logic 331.

The victim mode sample sets of L2 data 326 may be generated using any typical operation of an L2 cache 325 with a victim L3 cache 330, such as by evicting clean cache lines and write back of dirty data to the victim mode sample sets of L3 data 336. Similarly, the normal mode sample sets of L3 data 337 may be generated using any typical operation of the L2 cache 325 and L3 cache 330 in a non-victim or normal mode, such as by only writing back the dirty data to the normal mode sample sets of L3 data 337, but not evicting clean cache lines.

Once the sample sets have been generated, the logic 331 determines based on the sample sets of L3 data 336, 337 whether the benefits of operating the L3 cache 330 in victim mode outweighs the costs. This determination may be made in any manner desired. For example, in an embodiment, logic 331 may compare the cache misses of the victim mode sample sets of L3 data 336 and normal mode sample sets of L3 data 337 to each other and/or to a threshold value to determine the optimal evict policy—i.e. whether the L3 cache 330 should be operated in a normal mode or in a victim mode to the L2 cache 325. In an implementation of such an embodiment, the logic 331 may determine or measure the number of cache misses of the victim mode sample sets of L3 data 336 and compare that number to a threshold value. In another implementation, the logic 331 may determine or measure the number of cache misses of the victim mode sample sets of L3 data 336, subtract from that number the number of measured caches misses of the normal mode sample sets of L3 data 337, and compare the resulting difference to a threshold value.

The threshold value for such embodiments may be based on one or more of the cache capacity, cache latency or other performance attributes, the system architecture, the workload being performed by the system, the type of workload being performed (e.g. a graphics intensive application versus an audio file replay application), etc. in order to allow the logic 331 to dynamically determine if the benefits of operating the L3 cache 330 in a victim mode outweighs the "costs" of operating in victim mode such as in bandwidth, power consumption, etc. In various embodiments, the threshold value may be a single fixed, preset value, may be multiple values for varying conditions or workloads (such as different threshold values for different types of workloads), or may be a dynamic value that can be programmed or updated based on historical data, current conditions, etc.

The sampling period for when the logic 331 makes the determination may be at fixed or varying time intervals as desired, may be triggered by one or more events, or both. For example, in an embodiment the initiation of a workload, application, or thread on a processor, such a processor of the Nth Core 224 illustrated in FIG. 2 may be an event that triggers the sampling period for the logic 331 to make the determination whether the L3 cache 330 should operate in the victim mode for an L2 cache 225/335 associated with the Nth Core 224.

In some embodiments, once the determination is made, the L3 cache 330 would operate in that determined mode until the initiation of a new workload, application, or thread. In other embodiments, at one or more time intervals during the processing of the workload, application, or thread, a sampling period is initiated so that the logic 331 may make the determination periodically while the workload, application, or thread is being processed. In yet other embodiments, the completion of the workload, application, or thread may be a trigger event causing yet another determination by the logic 331.

Once the determination is made, the logic 231/331 may cause the L2 cache 225/325 and L3 cache 230/330 to operate in the victim/normal mode determined advantageous by the logic 231/331. In the embodiment illustrated in FIGS. 2 and 3A, the logic 231/331 may send a signal to another component, such as a signal over interconnect/bus 240 to memory controller 210, and the memory controller 210 causes the L2 cache 225/325 and L3 cache 230/330 to operate in the desired mode. In other embodiments, the logic 231/331 may be a separate component (not illustrated) in communication with both the L2 cache 225/325 and L3 cache 230/330. In such embodiments, the logic 231/331 acting by itself may cause the L2 cache 225/325 and L3 cache 230/330 to operate in the desired mode.

Note that although the discussion of FIG. 3A has been in terms of hardware components, the components and operations discussed above may also be implemented in and/or performed by software. For example, in an embodiment the second sample portion 325*b* of L2 cache 325 containing sample sets of L2 data illustrated in FIG. 3A may be divided into a victim mode sample set of L2 data 326 contained in one or more software writable registers, and a normal mode sample set of L2 data 327 contained in one or more software writable registers. Similarly, the L3 cache 330 of FIG. 3A may also have a second sample portion 330*b* containing sample sets of L3 data. The second portion 330*b* of the L3 cache 330 may be divided into a victim mode sample set of L3 data 336 contained in one or more software writable registers, and a normal mode sample set of L3 data 337 contained in one or more software writable registers. The victim mode sample sets of L3 data 336 and normal mode sample sets of L3 data 337 may both in communication with logic 331 of the L3 cache 330, which in this embodiment may be a software component. The logic 331 implemented in software in this embodiment may periodically determine the policy to impose by sampling the sample sets of L3 data 336/337 in the software registers and/or by otherwise obtaining information relevant to the policy determination, such as information about the program or workload being performed.

Turning to FIG. 3B, details of another exemplary embodiment of the cache memories in the exemplary system of FIG. 2 are illustrated. FIG. 3B illustrates aspects of an L2 cache 325' that corresponds to the L2 cache 225 of the Nth Core 224 shown in FIG. 2. Similarly, FIG. 3B illustrates aspects of an L3 cache 330' that corresponds to the L3 cache 230 shown in FIG. 2. Although FIG. 3B only illustrates one L2 cache 325', the principles are equally applicable to the additional L2 caches 221, 223 illustrated in FIG. 2.

As shown in FIG. 3B, the L2 cache 325' is divided into a first main portion 325*a*' containing the regular sets of cache data lines, and a second sample portion 325b' containing a sample set of L2 data 326'. Different from the embodiment illustrated in FIG. 3A, the second portion 325b' of the embodiment of FIG. 3B is not further subdivided into two different sample sets of L2 data.

Similarly, the L3 cache 330' is also partitioned into a first main portion 330a' containing the regular sets of cache data lines, and a second sample portion 330b' containing a sample set of L3 data 336'. The sample set of L3 data 336' is in communication with logic 331' of the L3 cache 330'. The logic 331' of the L3 cache corresponds with the logic 231 of L3 cache 230 shown in FIG. 2A. Note that although illustrated as part of the L3 cache 230/330', the logic 231/331' may be a separate hardware, firmware, or software component in communication with the L3 cache 230/330', the sample set of L3 data 336', and/or the L2 cache 225/325'.

In operation, the L2 cache 325' of FIG. 3B will generate either a sample set of L2 data 326' which will be either a victim mode sample set or a normal mode samples set, depending on the current mode of operation of the L3 cache 330'. If the L3 cache 330' is operating in a normal mode, the L2 cache 325' of FIG. 3B will generate a victim mode sample set of L2 data 326'. This generation of victim mode sample L2 data will result in a corresponding victim mode sample set of L3 data 336' being generated in the sample portion 330b' of the L3 cache 330'.

On the other hand, if the L3 cache 330' is operating in a victim mode, the L2 cache 325' of FIG. 3B will generate a normal mode sample set of L2 data 326'. This generation of normal sample L2 data will result in a corresponding normal mode sample sets of L3 data 336' being generated in the sample portion 330b' of the L3 cache 330'. Thus, the sample set of L2 data 326' and L3 data 336 will always follow the opposite policy/mode of the current operating mode of the L3 cache 330'.

During a sampling period, the logic 331' associated with the L3 cache 330' will dynamically determine based on the generated sample sets of L3 data 336' and the regular sets of cache data lines in the main portion 330a' whether the L3 cache 330' should be operated in a victim mode as a victim to the L2 cache 325', or whether the L3 cache 330' should be operated independently in a normal mode.

In an embodiment, the L2 cache 325' will continuously generate the sample sets of L2 data 326', and the resulting sample sets of L3 data 336' will be continuously generated in the L3 cache 330' such that it may be read or otherwise received by the logic 331' during sampling period. In other embodiments, the L2 cache 325' will only generate the sample sets of L2 data 326' (and cause the generation of the resulting sample sets of L3 data 336' in the L3 cache 330) during the sampling period of the logic 331'.

The sample sets of L2 data 326' may be generated using any typical operation of an L2 cache 325' as discussed above in FIG. 3A. For example, to generate victim mode sample set of L2 data 326' and L3 data 336', the L2 cache 325' may evict clean cache lines and write back dirty data to the sample sets of L3 data 336. Similarly, the normal mode sample sets of L2 data 326' L3 data 336' may be generated using any typical operation of the L2 cache 325' without a victim L3 cache 330', such as by only writing back the dirty data to the sample set of L3 data 336', but not evicting clean cache lines.

The logic 331' determines whether the sample set of L3 data 336' is providing better behavior than the regular data in the main portion 330a'. Whenever the sample set of L3 data 336' provides better behavior, the mode/policy of the sample set of L3 data 336' and the regular data in the main portion 330a' are both changed. Since the sample set of L3 data 336' is always operating in the opposite mode from the regular data, changing both results in flipping the mode/policies of the sample set and the regular data when the mode of the sample set of L3 data 336' is the more advantageous mode.

The logic 331' may make this determination of whether the sample set of L3 data 336' provides better behavior in any manner desired. For example, in an embodiment, logic 331' may compare the cache misses of the sample set of L3 data 336' with the cache misses of the regular set of cache data lines in the main portion 330a' to each other and/or to a threshold value to determine the optimal evict policy—i.e. whether the L3 cache 330' should be operated in its current mode, or whether the current mode should be changed. This determination may be made in the same manner discussed above for FIG. 3A.

In another embodiment, a number of clean evictions may be tracked during the sampling period for whichever data set (regular 325a' or sample 325b') is operating in victim mode, and that number may be compared to the number of cache hits from the same data set. If the number of cache hits divided by the number of clean evictions is greater than a threshold value the victim mode is the determined mode. If the L3 cache 330' (i.e. the regular data in the main portion 330a') is currently operating in the victim mode for the sampling period, then no change is made. If the sample set of L3 data 336' is operating in the victim mode for the sampling period, then the mode/policy the main portion 330a' and the sample portion 330b are both changed, causing the L3 cache 330' to begin operating in victim mode (while the sample set of L3 data 336' will begin sampling/operating in normal mode).

The threshold value for either method of determination may be based on one or more of the cache capacity, cache latency or other performance attributes, the system architecture, the workload being performed by the system, the type of workload being performed (e.g. a graphics intensive application versus an audio file replay application), etc. in order to allow the logic 331' to dynamically determine if the benefits of operating the L3 cache 330' in a victim mode outweighs the "costs" of operating in victim mode such as in bandwidth, power consumption, etc. In various embodiments, the threshold value may be a single fixed, preset value, may be multiple values for varying conditions or workloads (such as different threshold values for different types of workloads), or may be a dynamic value that can be programmed or updated based on historical data, current conditions, etc.

The sampling period for when the logic 331' makes the determination may be at fixed or varying time intervals as desired, may be triggered by one or more events, or both. For example, in an embodiment the initiation of a workload, application, or thread on a processor, such a processor of the Nth Core 224 illustrated in FIG. 2 may be an event that triggers the sampling period for the logic 331' to make the determination whether the L3 cache 330' should operate in the victim mode for an L2 cache 225/335' associated with the Nth Core 224.

In some embodiments, once the determination is made, the L3 cache 330' would operate in that determined mode until the initiation of a new workload, application, or thread. In other embodiments, at one or more time intervals during the processing of the workload, application, or thread, a sampling period is initiated so that the logic 331 may make the determination periodically while the workload, application, or thread is being processed. In yet other embodiments, the completion of the workload, application, or thread may be a trigger event causing yet another determination by the logic 331'.

Once the determination is made, the logic 231/331' may cause the L2 cache 225/325' and L3 cache 230/330' to operate in the victim/normal mode determined advantageous by the logic 231/331'. In the embodiment illustrated in FIGS. 2 and 3B, the logic 231/331' may send a signal to another component, such as a signal over interconnect/bus 240 to memory controller 210, and the memory controller 210 causes the L2 cache 225/325' and L3 cache 230/330' to operate in the desired mode. In other embodiments, the logic 231/331' may be a separate component (not illustrated) in communication with both the L2 cache 225/325' and L3 cache 230/330'. In such embodiments, the logic 231/331' acting by itself may cause the L2 cache 225/325' and L3 cache 230/330' to operate in the desired mode.

Figure 4:
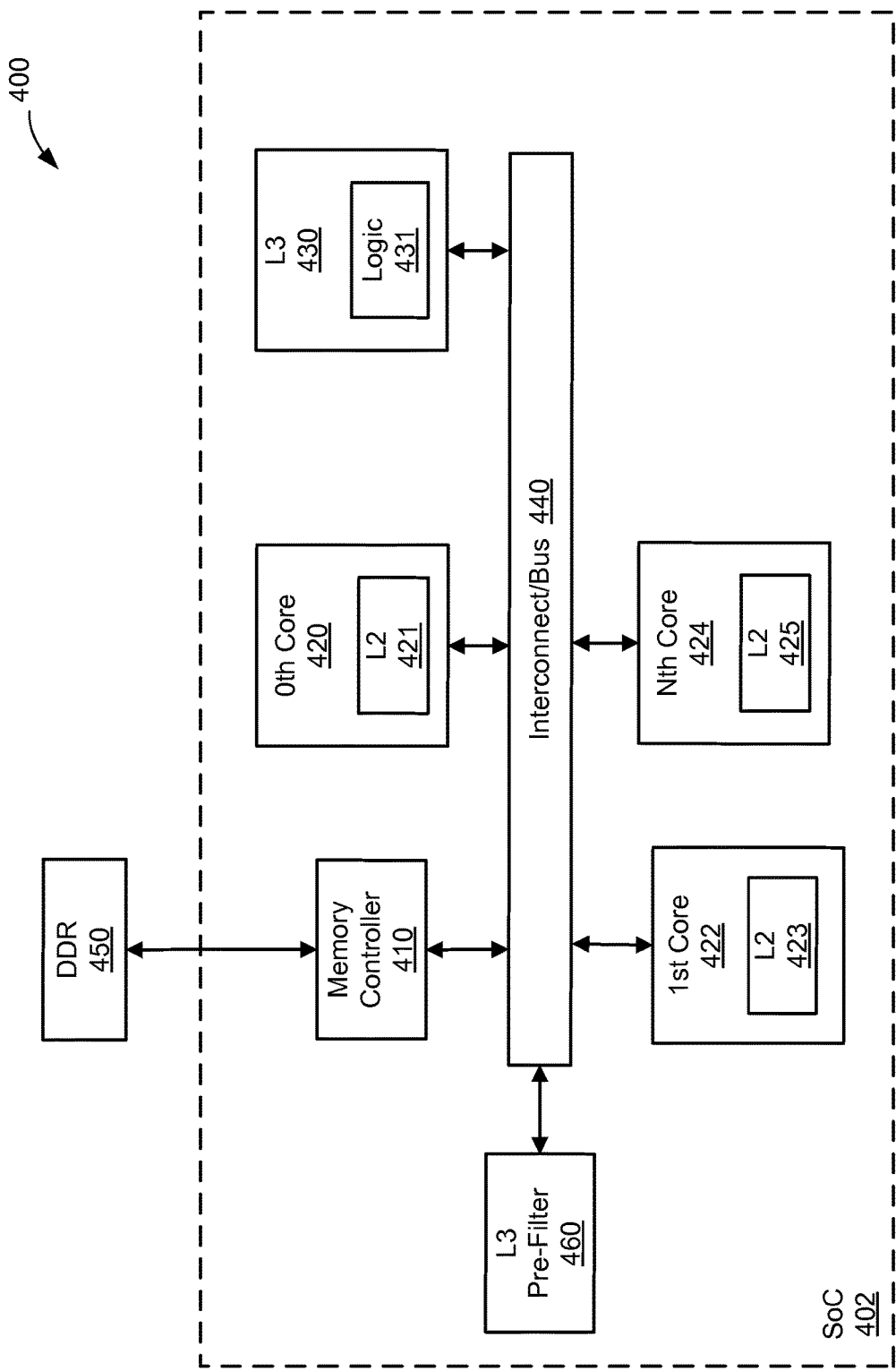
FIG. 4 is a block diagram showing another exemplary embodiment of a system for adaptive implementation of victim cache modes with improved operation of the cache memories in a PCD, such as the PCD embodiment illustrated in FIG. 1.

Another aspect of the present disclosure is illustrated in FIG. 4. FIG. 4 illustrates another exemplary embodiment of a system 400 for adaptive implementation of victim cache modes with improved operation of the cache memories in a PCD, such as the PCD embodiment illustrated in FIG. 1. FIG. 4 illustrates an exemplary system 400 including a system-on-a-chip (SoC) integrated circuit 402, which could be implemented in a PCD (similar to the SoC 102 in FIG. 1). The SoC 402 of FIG. 4 includes a Memory Controller 410, 0th Core 420, 1st Core 422, Nth Core 424, and L3 cache 430 all connected to an interconnect or bus 440 of the SoC 402. The interconnect/bus 440 of the SoC 402 may be any desired type of bus or interconnect which may depend on the architecture of the SoC 402 and/or the uses for which the SoC 402 or PCD are intended.

As illustrated in the embodiment of FIG. 4, the Memory Controller 410 is in communication with the interconnect/bus 450 and also in communication with a memory external to the SOC 402, DDR 450. Memory Controller 410 may control access to various memories of the SoC 402 including L3 cache 430, and also may allow the various components of the SoC 402, including 0th Core 420, 1st Core 422 and Nth Core 424, to access the external DDR 450 memory.

The SoC 402 may also include other components and/or sub-systems (including those illustrated in FIG. 1) which are not shown in FIG. 4 for clarity. Each of 0th Core 420, 1st Core 422 and Nth Core 424 will include a processor of some type, and each may be implemented as one of the cores 120, 122, 124, 126 discussed above for FIG. 1. In some embodiments, the processor of one or more of the 0th Core 420, 1st Core 422 and Nth Core 424 could be implemented as a general purpose processing unit, while in other embodiments the processor(s) may be implemented as a dedicated processor, such as a DSP. Each of 0th Core 420, 1st Core 422 and Nth Core 424 also includes at least one cache memory, illustrated in the FIG. 4 as the L2 cache 421 (for 0th Core 420) L2 cache 423 (for 1st Core 422), and L2 cache 425 (for Nth Core 424).

In various embodiments, one or more of 0th Core 420, 1st Core 422 and Nth Core 424 may include more or less components than illustrated in FIG. 4, such as additional L1 cache(s). Additionally, in some embodiments, the components illustrated in FIG. 4 may be physically arranged on the SoC 402 in varying configurations and one or more components illustrated in FIG. 4 may not be physically located near each other on the SoC 402.

In the embodiment illustrated in FIG. 4, the L2 caches 421, 423, 425, the L3 cache 430, and the DDR 450 may be organized in a hierarchy where the L2 caches 421, 423, 425 represent the smallest data capacity but fastest performance/ lowest latency, the L3 cache 430 having a larger data capacity, but slower performance/higher latency than the L2 caches 421, 423, 425, and the DDR 450 having the largest data capacity and slowest performance/highest latency. In this embodiment, the L3 cache 430 is a lower level cache than the L2 caches 421, 423, 425. Additionally, in the illustrated embodiment, the L3 cache 230 may be operated either as an independent cache that may be directly accessed by any of 0th Core 420, 1st Core 422 or Nth Core 424 ("normal mode"), or the L3 cache 230 may be a victim cache for one or more of the higher level L2 caches 421, 423, 425 ("victim mode"). As described above the operation of the L3 cache 430 in normal mode or victim mode may be dynamically determined and/or set and subsequently changed during the operation of the PCD. However, for the system 400 of FIG. 4, it is not necessary that determination or selection of the victim mode for the L3 cache 430 be dynamic.

When the L3 cache 430 is operating in victim mode, a cache miss at the L2 cache by a processor (L2 cache 423 and 1st Core 422 for example) will go to the victim L3 cache 430. A miss at the L3 cache 430 will go from the L3 to the Memory Controller 410 and to the DDR 450. Data returned from the DDR 450 would go from the Memory Controller 410 to the L3 cache 430 and then back to the requesting processor (1st Core 422 in this example). This greatly increases the L2 cache 423 miss latency and degrades the performance of the processor associated with the L2 cache 423 (a processor of 1st Core 422 in this example).

The system 400 helps decrease this L2 cache 423 miss latency with the L3 Filter 460 illustrated in communication with the Interconnect/Bus 440. The L3 Filter 460 is a duplication of the data contained in the victim L3 cache 430 in a simpler structure such as a tag array or a bloom filter implemented in hardware. This L3 Filter 460 may be used with the L3 cache 430 of the system 400 when the L3 cache 430 is operating in victim mode, either continuously or dynamically as part of an adaptive system as discussed above.

As would be understood by one of ordinary skill in the art, although discussed herein with respect to an L3 cache 430 being operated in a victim mode, the principles of the pre-filter discussed are equally applicable to any cache that is being operated as a victim to a higher level cache. For example, if desired instead of an L3 Filter 460 as illustrated in FIG. 4, the block 460 could be an L2 Filter (not shown) for an L2 cache that may be operating as a victim for a higher level cache, such as an L1 cache (not shown). Similarly, in other embodiments, the block 460 could be an L4 Filter (not shown) for the L4 cache (not shown) that may be operating as a victim for the L3 cache 430.

In the embodiment illustrated in FIG. 4, during the operation of the L3 cache 430 in victim mode, when the L3 cache 430 is forced to accept cache line castout from an L2 cache, such as L2 cache 423, a corresponding entry is made in the L3 Filter 460 so that the L3 Filter 460 contains some annotation that the cache line is present in the L3 cache 430. The form of the communication and/or the annotation made may depend on how the L3 Filter 460 is implemented (e.g. bloom filter, tag array, etc.). Similarly, when a cache line is evicted from the L3 cache 430 operating in victim mode, a corresponding entry is made or updated in the L3 Filter 460 so that the L3 Filter 460 reflects that the cache line is no longer present in the L3 cache 430. For example in an implementation where the L3 Filter 460 is a bloom filter, for a victim line replacement at the L3 cache 430 an "evict without data" message may be issued when a cache line in the L3 cache 430 to be replaced by the victim line is clean in order to update the bloom filter of L3 filter 460.

During the operation of the system 400, after an L2 cache 423 miss by a processor, such as a processor of the 1st Core 422, the processor can quickly determine whether the desired cache line is in the victim L3 cache 430 by checking the L3 Filter 460. If the cache line is in the L3 Filter 460, the L2 cache 423 miss would then proceed to the L3 cache 460 for the cache line. If the cache line is not in the L3 Filter 460, the L2 cache 423 miss would not need to check the L3 cache 430, and would instead proceed directly to the Memory Controller 410 and on to the DDR 450, greatly decreasing the L2 cache 423 miss latency. If, as a result of the L2 cache 423 miss, the L2 cache 423 is updated resulting in cache line castout from the L2 cache 423 to the victim L3 cache 430, the L3 Filter 460 is updated to reflect the new cache line being written to the L3 cache 430, as well as any cache lines being evicted from the L3 cache 430.

In an embodiment, the L3 Filter 460 may also include or be in communication with the point of serialization (not shown). By either including the point of serialization in the L3 Filter 460, or as a separate component in communication with the L3 Filter 460, any data subsequently returned from the DDR 450 after an L3 cache 430 "miss" (the "miss" coming as a result of checking the L3 Filter 460 as discussed above) can be sent directly back to the requesting processor. This would even further reduce the latency penalty for an L2 cache 423 miss. The L3 Filter 460 and point of serialization may be contained together within one hardware unit, or may be separate hardware units in communication with each other as desired for such embodiments.

Figure 5A:
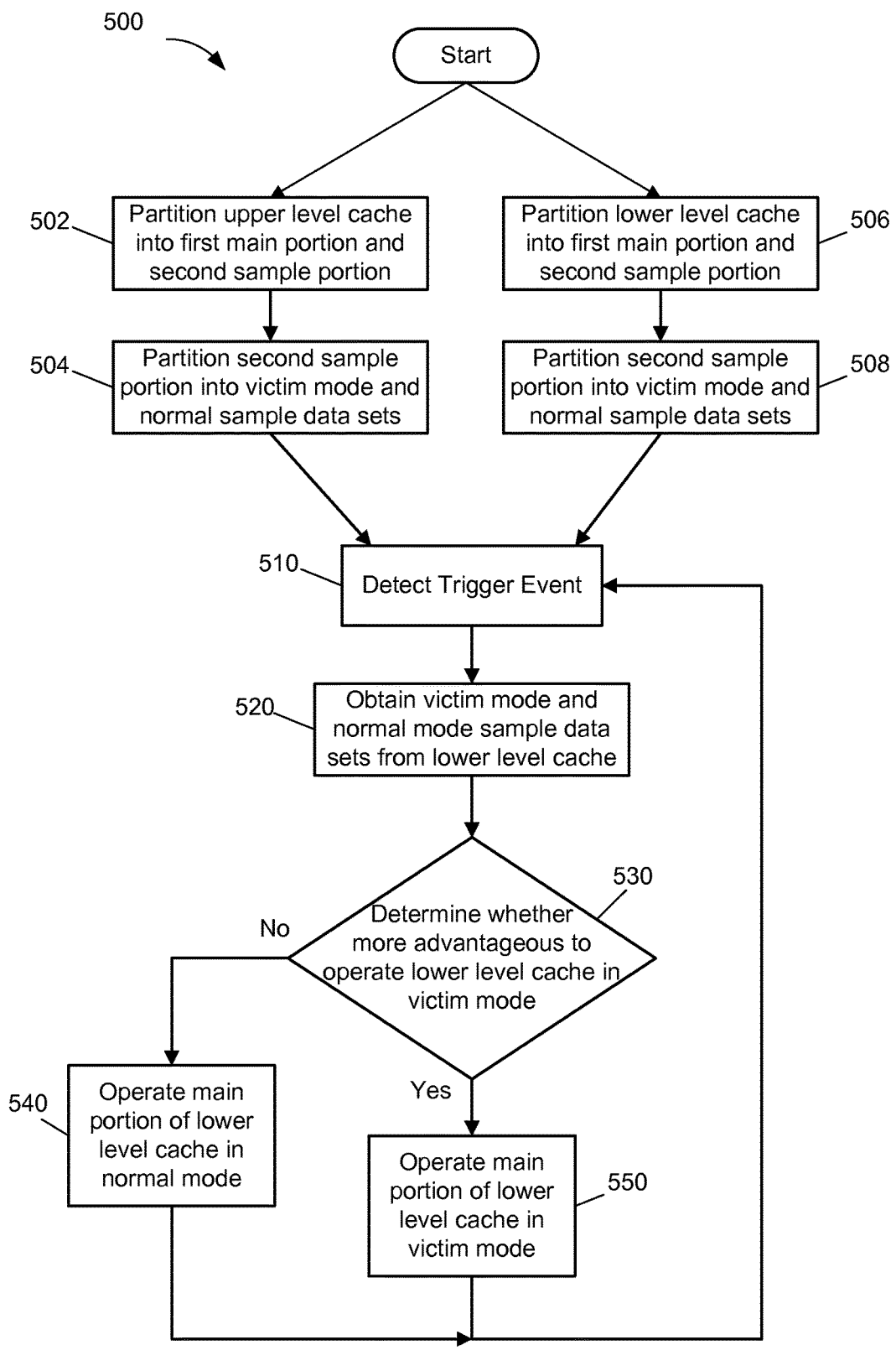
FIG. 5A is a flowchart describing aspects of an exemplary embodiment of a method for adaptive implementation of victim cache modes in a PCD.

FIG. 5A is a flowchart describing aspects of an exemplary embodiment of a method 500 for adaptive implementation of victim cache modes in a PCD. In block 502 an upper level cache is partitioned into a first main portion and a second sample portion. The upper level cache of block 502 may be in some embodiments an L2 cache associated with a processor, such as for example one of L2 cache 221, 223, 225 illustrated in the exemplary system 200 of FIG. 1. In other embodiments, the upper level cache may be an L1 cache, an L3 cache or any level of cache, depending on the particular architecture of the implementation.

The first main portion of the upper level cache of block 502 may contain regular sets of L2 cache data lines, and the second sample portion may contain samples sets of L2 data. For example as illustrated in the embodiment of FIG. 3A an L2 cache 325 may divided into a first main portion 325a that contains regular sets of cache data lines, and a second sample portion 325b that contains sample sets of L2 data.

In block 504 the second sample portion created in block 502 is further partitioned into victim mode sample data sets and normal mode sample data sets, effectively partitioning the upper level cache into three data sets. Continuing with the example of FIG. 3A, the second portion 325b of the embodiment of FIG. 3A is illustrated as being further subdivided into victim mode sample sets of L2 data 326 and normal mode sample sets of L2 data 327, effectively partitioning the L2 cache 325 into three data sets.

In block 506 a lower level cache is also partitioned into a first main portion and a second sample portion. The lower level cache is lower in level with respect to the upper level cache of the memory hierarchy, which in an embodiment means that the lower level cache has a larger capacity than the upper level cache and/or a lower performance level than the upper level cache. In the example above where the upper level cache is an L2 cache, the lower level cache may be an L3 cache or an L4 cache. For instance, as illustrated in FIG. 3A, where the upper level cache is an L2 cache 325, the lower level cache may be an L3 cache 330 that is also divided into a first main portion 330a containing the regular sets of cache data lines, and a second sample portion 330b containing sample sets of L3 data.

In block 508 the second sample portion created in block 506 is further partitioned into victim mode sample data sets and normal mode sample data sets, effectively partitioning the lower level cache into three data sets. These three data sets may correspond with the three data sets created in blocks 502-504 discussed above. Continuing with the example of FIG. 3A, the illustrated second portion 330b of the illustrated L3 cache 330 is further subdivided into victim mode sample sets of L3 data 336 and normal mode sample sets of L3 data 337, effectively partitioning the L3 cache 330 into three data sets.

Note that although blocks 502-504 and 506-508 are illustrated as occurring in parallel in the exemplary method 500 of FIG. 5A, in other embodiments, these blocks may occur sequentially, with the upper level cache being partitioned first followed by the partitioning of the lower level cache (and vice versa). Similarly, although blocks 502-504 are illustrated in the method 500 as involving two separate partition operations for the upper level cache, in other embodiments these blocks 502-504 may be combined into one block that results in the three portions of the upper level cache. The same is also true for the partition operations of blocks 506-508 for the lower level cache.

In block 510 a trigger event is detected. The trigger event of block 510 may in some embodiments be an operational change of the system, such as at start-up of the system, or at the start of a particular workload. The trigger event of block 510 may also be in some embodiments a periodic event, such as the firing of a timer at a regular (or irregular) interval. In other embodiments, a mixture of operational-based and time-based trigger events may be used, such as for example detecting the trigger event at the beginning of a particular workload and then periodically during the processing of the workload.

The trigger event of block 510 may be detected by any component in communication with the upper level cache and/or the lower level cache. In an embodiment, the trigger event may be detected by logic in, or in communication with the lower level cache, such as logic 331 of the L3 cache 330 illustrated in FIG. 3A.

Turning to block 520, the method 500 obtains victim mode sample data and normal mode sample data from the lower level cache. For example, as illustrated in FIG. 3A, the second sample portion 325b of the L2 cache 325 may be caused to generate both victim mode sample sets of L2 data 326 and normal mode samples sets of L2 data 327. This generation of sample L2 data will result in corresponding victim mode sample sets of L3 data 336 and normal mode sample sets of L3 data 337 being generated in the sample portion 330b of the L3 cache 330. These data sets of the lower level cache may then be obtained in accordance with block 520, such as for example by logic 331 associated with the lower level cache (L3 cache 330) receiving or reading the sample data sets during a sampling period.

In some embodiments, upper level cache (such as L2 cache 325 of FIG. 3A) may continuously cause the resulting lower level cache victim mode sample data sets and normal mode sample data sets to generate. In such embodiments, these continuously generated sample data sets may just be received or read during the sampling period. In other embodiments, the upper level cache may only cause the resulting lower level cache victim mode sample data sets and normal mode sample data sets to be generate during the sampling period.

The victim mode sample data set of the lower level cache obtained in block 520 may be generated using any desired methods. For example, the victim mode sample data set may generated using any typical operation of an upper level cache to which the lower level cache is coupled as a victim cache, such as by evicting clean cache lines and write back of dirty data to the victim mode sample data set of the lower level cache. Similarly, the normal mode sample sets of the lower level cache may be generated using any typical operation of the upper level cache and lower level cache in a non-victim or normal mode, such as by only writing back the dirty data to the normal mode sample data set of the lower level cache, but not evicting clean cache lines.

Once the sample data sets have been obtained from the lower level cache in block 520, the method 500 determines whether it is more advantageous to operate the lower level cache in victim mode in block 530. The determination of block 530 may be made by any component in communication with the upper level cache and/or the lower level cache. For example, in one embodiment, the determination of clock 530 may be made by logic in, or in communication with the lower level cache, such as logic 331 of the L3 cache 330 illustrated in FIG. 3A.

In an embodiment, the determination of block 530 may comprise comparing the cache misses of the victim mode sample data set of the lower level cache with the normal mode sample data set of the lower level cache and/or with a threshold value to determine whether it is optimal to operate the lower level cache as a victim to the upper level cache. The determination may include for example, measuring the number of cache misses of the victim mode sample data set of the lower level cache and comparing that number to a threshold value. In another implementation, the determination may include measuring the number of cache misses of the victim mode sample data set of the lower level cache and subtracting from that number the number of measured caches misses of the normal mode sample data set of the lower level cache and comparing the resulting difference to a threshold value.

The threshold value for such embodiments may be based on one or more of the cache capacity, cache latency or other performance attributes, the system architecture, the workload being performed by the system, the type of workload being performed (e.g. a graphics intensive application versus an audio file replay application), etc. in order to allow a dynamic determination whether the benefits of operating the lower level cache as a victim cache outweighs the "costs" of such operation.

If the determination of block 520 is that the lower level cache should not be operated in victim mode, the method 500 proceeds to block 540 and operates the main portion of the lower level cache in a normal, non-victim cache mode. In the event that the main portion of the lower level cache was already operating in a normal, non-victim mode, block 540 will not cause any operational change to the lower level cache. The lower level cache will continue to operate in this mode and the method 500 will return to block 510 waiting for the next trigger event to be detected.

However, if the main portion of the lower level cache was operating as a victim cache when the determination of block 530 is made to operate in a normal mode, block 540 will cause the main portion of the lower level cache to being operating in a normal, non-victim mode. This change in operation of the main portion of the lower level cache may be effected in any manner desired, such as for example a signal over interconnect/bus 240 to a Memory Controller 210 in the exemplary system 200 of FIG. 2. In that embodiment, the Memory Controller 210 causes the upper level cache (L2 cache 225/325 in this example) and the lower level cache (L3 cache 230/330 in this example) to operate in the desired normal mode. In other embodiments, a separate component apart from a system memory controller that is in communication with both the upper level and the lower level may act to cause the upper level cache and lower level cache to operate in the desired normal mode without use of the memory controller.

Returning to block 530, if the determination is that operating the lower level cache as a victim to the upper level cache is advantageous, the method proceeds to block 550 and operates the main portion of the lower level cache as a victim to the upper level cache. The operation of block 550 may be similar to that discussed above for block 540 but in reverse (i.e. causing the lower level cache to continue to operate as a victim cache if already operating in that mode, but causing the lower level cache to change to a victim operation if currently operating as a normal, non-victim cache). The method 500 then returns to block 510 and waits for the next trigger event to be detected.

Figure 6A:
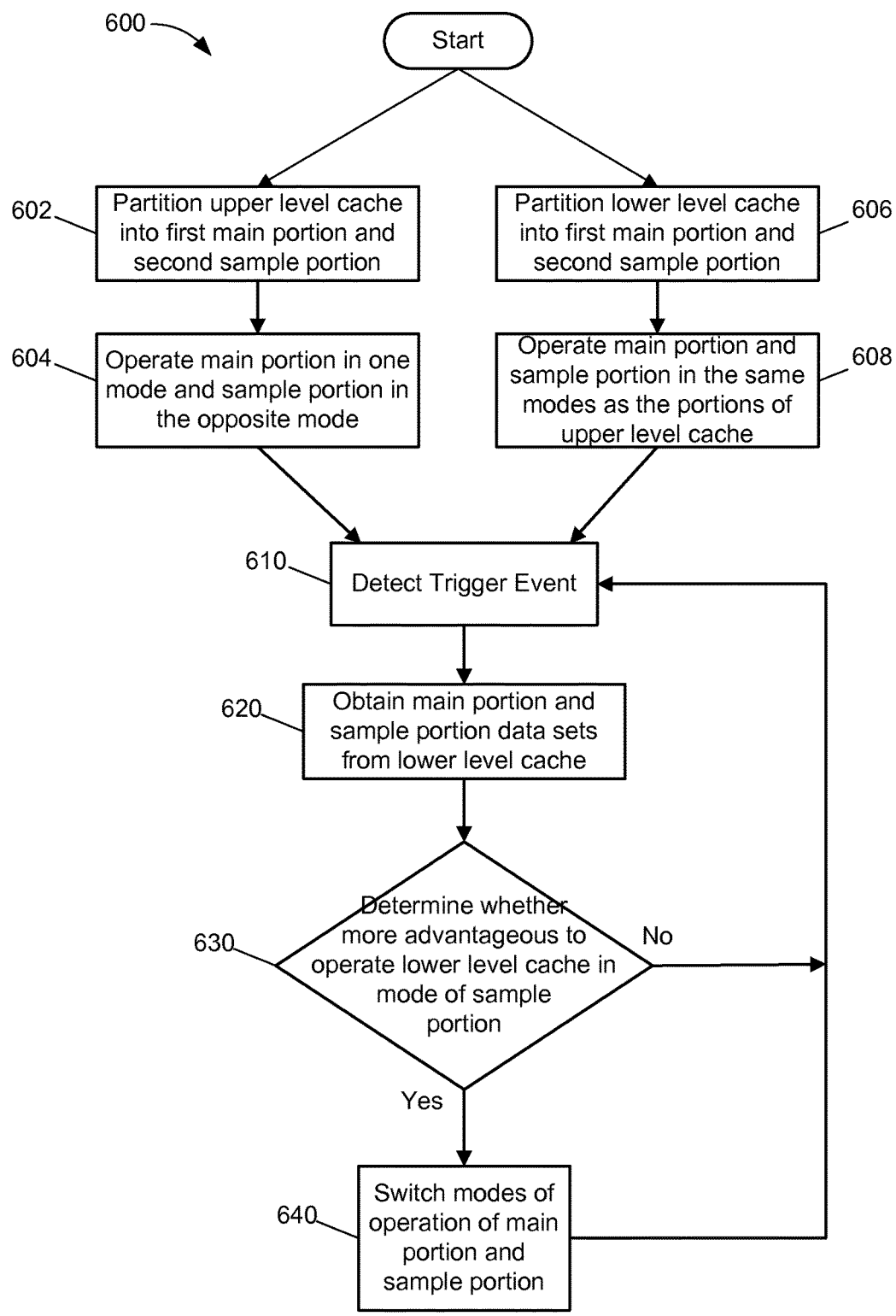
FIG. 6A is a flowchart describing aspects of another exemplary embodiment of a method for adaptive implementation of victim cache modes in a PCD.

FIG. 6A is a flowchart describing aspects of another exemplary embodiment of a method 600 for adaptive implementation of victim cache modes in a PCD. FIG. 6A is similar the method 500 of FIG. SA, except that in method 600 only one sample data set for the upper cache and lower cache is generated and that sample set is always generated by operating in a the opposite mode to the operation of the main portion of the upper cache and lower cache. In this manner, the main portion of the upper cache effectively takes the place of the second set of sample data of the previous method 500.

Method 600 begins in block 602 where the upper level cache is partitioned into a first main portion and second sample portion, similar to block 502 of FIG. SA. In block 604 the main portion of the upper level cache is operated in one of a normal mode (where the upper cache has no victim cache) or a victim mode (where a lower level cache is assumed to be a victim to the upper level cache). In different embodiments block 604 may cause the main portion of the upper level cache to be operated in either of these modes as desired, and one of the modes may be established as an automatic default. Regardless of which mode is selected for the main portion of the upper level cache, the sample portion is operated in the other/opposite mode.

In block 606, the lower level cache is also partitioned into a first main portion and a second sample portion, similar to block 506 of FIG. SA. In block 608, the main portion of the lower level cache is operated in the same mode as the main portion of the upper level cache. Similarly, the sample portion of the lower level cache is operated in the same mode as the sample portion of the upper level cache. Thus, like the upper level cache, block 608 ensures that the regardless of which mode the main portion of the lower level cache operates in, the sample portion is operated I the other/opposite mode.

Blocks 602-604 (for upper level cache) and 606-608 (for lower level cache) are illustrated as occurring in parallel in the exemplary method 600 of FIG. 6A. In other embodiments of the method 600, blocks 602-604 may occur sequentially rather than in parallel. Additionally, in some embodiments, block 604 may not be a separate step from block 602 (e.g. the respective modes of operation for the portions of block 604 may be set when the portions are created in block 602 rather than as a separate step). The same is true for blocks 606-608 in some embodiments.

In block 610 a trigger event is detected. Similar to block 510 of FIG. 5A, the trigger event of block 610 may in some embodiments be an operational change of the system, such as at start-up of the system, or at the start of a particular workload. The trigger event of block 610 may also be in some embodiments a periodic event, such as the firing of a timer at a regular (or irregular) interval. In other embodiments, a mixture of operational-based and time-based trigger events may be used. Additionally, the trigger event of block 610 may be detected by any component in communication with the upper level cache and/or the lower level cache. In an embodiment, the trigger event may be detected by logic in, or in communication with the lower level cache, such as logic 331' of the L3 cache 330' illustrated in FIG. 3B.

Turning to block 620, the method 600 obtains a main portion data set and a sample portion data set from the lower level cache. Since the main portion and the sample portion of the lower level cache are operating in opposite modes, these data sets will comprise one data set representing operation of the lower level cache as a victim to the upper level cache, and one data set representing operation of the lower level cache as a normal, non-victim cache.

For example, as illustrated in FIG. 3B, main portion 325a' of the L2 cache 325' will operate in accordance with the mode set/selected in block 604 of the method 600. Depending on the mode for the main portion 325a', the operation of the upper level cache (L2 cache 325') and the system 200 (FIG. 2) will result in either victim or normal, non-victim cache data sets to be continuously generated in the main portion 330a' of the lower level cache (L3 cache 330' in the example of FIG. 3B). The data sets of the main portion of the lower level cache are obtained or read in block 620.

Similarly, the sample portion 325b' of the L2 cache 325' may be caused to generate a sample set of L2 data 326 and the type of sample (victim or normal) will depend on the mode of operation of the main portion 325a'. This generation of sample L2 data will result in a corresponding sample set of L3 data 336' being generated in the sample portion 330b' of the L3 cache 330'. This sample data set of the lower level cache may then be obtained in accordance with block 620, such as for example by logic 331' associated with the lower level cache (L3 cache 330') receiving or reading the sample data sets during a sampling period.

In some embodiments, upper level cache (such as L2 cache 325' of FIG. 3A) may continuously cause the resulting lower level cache sample data set to generate. In such embodiments, this continuously generated sample data set may just be received or read during a sampling period. In other embodiments, the upper level cache may only cause the resulting lower level cache sample data set to be generated during the sampling period.

The sample data set of the lower level cache obtained in block 620 may be generated using any desired methods. For example, a victim mode sample data set may generated (when the sample portion is directed to operate in a victim mode) using any typical operation of an upper level cache to which the lower level cache is coupled as a victim cache, such as by evicting clean cache lines and write back of dirty data to the victim mode sample data set of the lower level cache. Similarly, the normal mode sample sets of the lower level cache may be generated (when the sample portion is directed to operate in a victim mode) using any typical operation of the upper level cache and lower level cache in a non-victim or normal mode, such as by only writing back the dirty data to the normal mode sample data set of the lower level cache, but not evicting clean cache lines.

Once the main portion and sample portion data sets have been obtained from the lower level cache in block 620, the method 600 in block 630 determines whether it is more advantageous to operate the lower level cache in the mode of the sample set. The determination of block 630 may be made by any component in communication with the upper level cache and/or the lower level cache. For example, in one embodiment, the determination of clock 630 may be made by logic in, or in communication with the lower level cache, such as logic 331' of the L3 cache 330' illustrated in FIG. 3B.

In an embodiment, block 630 whether the sample set of data (such as L3 data 336' in the example of FIG. 3B) is providing better behavior than the regular data in the main portion (330a' in FIG. 3B). This determination may be made in any manner desired. For example, in an embodiment, the determination of block 630 may comprise comparing the cache misses of the sample set of data from the sample portion with the cache misses of the regular set of cache data lines in the main portion to each other and/or to a threshold value to determine whether the lower level cache should be operated in its current mode, or whether the current mode should be changed. This determination in such embodiments may be made in the same manner discussed above for FIG. 5A.

In another embodiment, a number of clean evictions may be tracked during the sampling period for whichever data set (main portion or sample portion) is operating in victim mode, and that number may be compared to the number of cache hits from the same data set. If the number of cache hits divided by the number of clean evictions is greater than a threshold value, the victim mode is the determined mode. If the number of cache hits divided by the number of clean evictions is greater than the threshold value, the non-victim mode is the determined mode. In such embodiments, block 630 then identifies or determines whether or not the sample portion is the portion operating in the determined mode (i.e. whether it is more advantageous to operate the lower level cache in the mode of the sample portion).

As discussed above, the threshold value for either method of determination may be based on one or more of the cache capacity, cache latency or other performance attributes, the system architecture, the workload being performed by the system, the type of workload being performed (e.g. a graphics intensive application versus an audio file replay application). In various embodiments, the threshold value may be a single fixed, preset value, may be multiple values for varying conditions or workloads (such as different threshold values for different types of workloads), or may be a dynamic value that can be programmed or updated based on historical data, current conditions, etc.

If the determination in block 630 is yes (i.e. it is more advantageous to operate the lower level cache in the mode of the sample portion), the method 600 continues to block 640 and switches the modes of operation of both the main portion and the sample portion for both the upper level cache and the lower level cache. As discussed above changing the mode of operation from non-victim to victim (or vice versa) may be accomplished by a separate component in communication with both the upper level cache and the lower level cache, or may be accomplished by signaling a Memory Controller (such as 210 in FIG. 2) over an Interconnect/Bus 240. The method 600 then returns to block 610 to wait for another Trigger Event to be detected.

If the determination in block 630 is no (i.e. it is not more advantageous to operate the lower level cache in the mode of the sample portion), the method 600 returns to block 610 to wait for another Trigger Event to be detected.

Thus, whenever the sample set of data in the lower level cache provides better behavior, the mode/policy of the sample portion and the main portion are both changed. Since the sample portion is always operating in the opposite mode from the main portion, changing both results in flipping the mode/policies of the sample set in the sample portion and the regular data of the main portion.

Figure 7A:
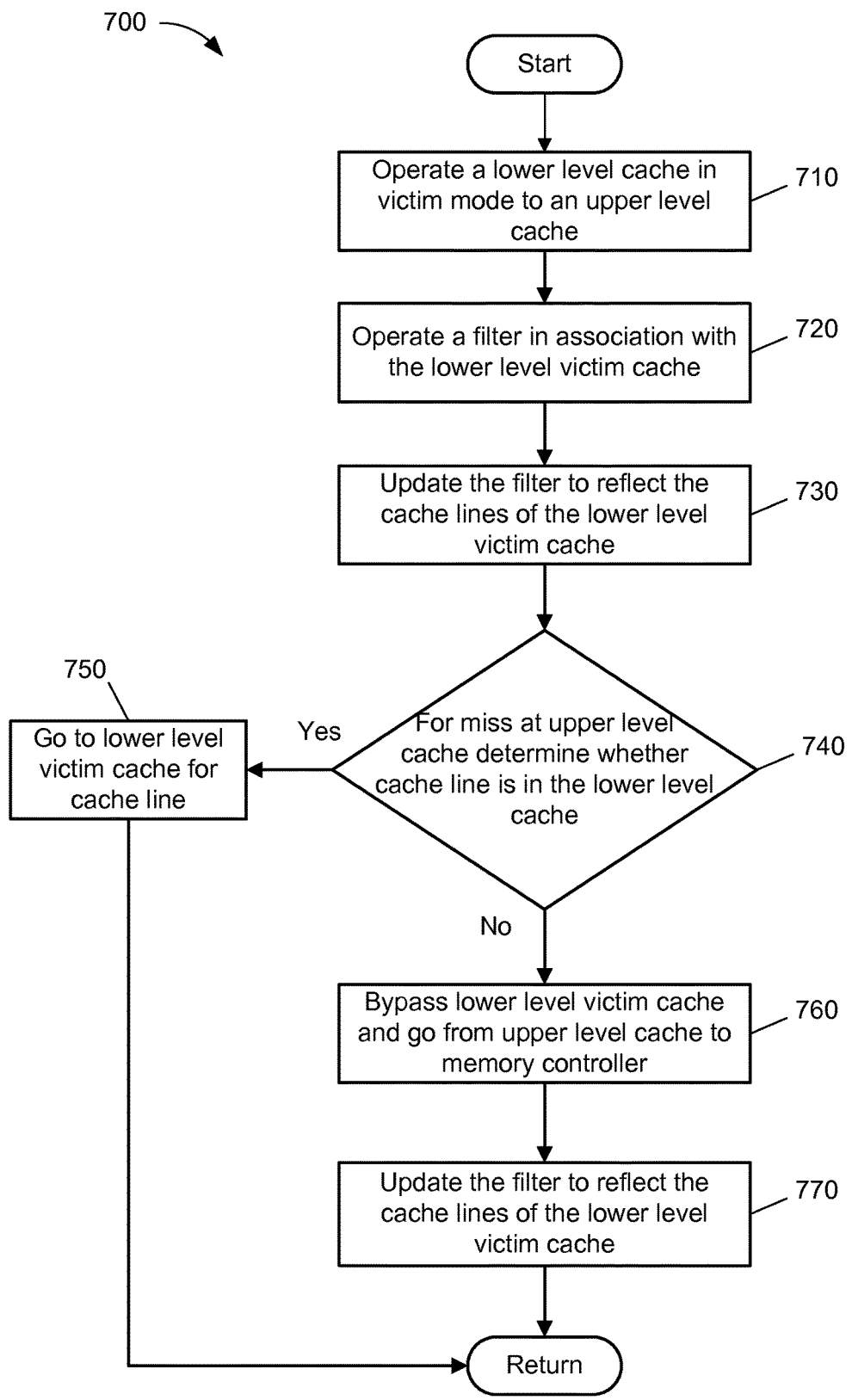
FIG. 7A is a flowchart describing aspects of an exemplary embodiment of a method for adaptive implementation of victim cache modes with improved operation of the cache memories in a PCD.

FIG. 7A is a flowchart describing aspects of an exemplary embodiment of a method 700 for adaptive implementation of victim cache modes with improved operation of the cache memories in a PCD. The method 700 begins in block 710 with a lower level cache being operated in a victim mode to an upper level cache. The lower level cache may be dynamically and/or adaptively operating as a victim cache as discussed above with respect to FIGS. 5A and 6A. In other embodiments, the lower level cache may be operating continuously as a victim cache.

The upper level cache and lower level cache will be part of a memory hierarchy as discussed above. In an embodiment, the lower level cache will have a larger capacity and/or slower performance in comparison to the upper level cache. The upper level cache will typically by associated with a processor, such as an L1 or L2 cache, but in some embodiments, the upper level cache can be any level of cache (including L3 or L4) where the memory hierarchy includes at least one level of cache lower than the upper cache level.

In block 720 a filter is operated in association with the lower level victim cache. The filter may be a filter 460 as illustrated in FIG. 4, and may be any desired filter structure, such as a bloom filter, tag array, etc. In an embodiment, the filter is a duplication of the data contained in the lower level victim cache implemented in a simpler structure.

In block 730, the filter is updated to reflect the cache lines of the lower level victim cache. In an embodiment, during the operation of the lower level cache as a victim cache to an upper level cache (such as the L3 cache 430 illustrated in FIG. 4), when the lower level cache is forced to accept cache line castout from the upper level cache, a corresponding entry is made in the filter so that the filter contains some annotation or record that the cache line is present in the lower level victim cache.

The form of the communication and/or the annotation made may depend on how the filter 460 is implemented (e.g. bloom filter, tag array, etc.). For example, in an implementation updating the filter in block 730 may comprise making or altering an entry in the filter when a cache line is evicted from the lower level victim cache to reflect that the cache line is no longer present in the lower level victim cache. In this implementation, if the filter is a bloom filter, updating the filter in block 730 may comprise issuing an "evict without data" message when the cache line being replaced at the lower level cache by a victim line is clean.

In block 740, in the event of a cache miss at the upper level cache, a determination is made whether the cache line is in the lower level cache. In an embodiment, this determination may be made by checking the filter for the cache line in the event of a miss at the upper level cache. Thus, by way of example, after an L2 cache 423 miss by a processor in the embodiment illustrated in FIG. 4, the processor can quickly determine whether the desired cache line is in the lower level victim cache by checking the filter in block 740. If the determination at block 740 is yes, (i.e. if the upper level cache miss hits on the filter), the upper level miss continues to the lower level victim cache for retrieval of the cache line in block 750. The method 700 then returns.

If the determination at block 740 is no, (i.e. if the upper level cache miss also misses on the filter), the upper level cache miss bypasses the lower level victim cache in block 760. Thus, if the cache line is not in the filter, the upper level cache miss would not need to check the lower level cache itself (and incur the latency of the request to and answer from the lower level victim cache). Instead, in block 760, the upper level cache miss, would proceed directly to the memory controller, such as Memory Controller 410 in FIG. 4, and on to a main memory, such as DDR 450 of FIG. 4. This greatly decreases the upper level cache miss latency penalty.

If as a result of the request to the memory controller in block 670 the upper level cache is updated, such updates may cause cache line castout from the upper level cache to the lower level victim cache. In block 770, the filter is updated to reflect the new cache line being written to the lower level cache, as well as any cache lines being evicted from the lower level cache. The method 770 then returns.

As would be understood by one of ordinary skill in the art, FIGS. 5A, 6A, and 7A describe only one exemplary embodiment of the disclosed methods 500, 600 and 700, respectively. In other embodiments, additional blocks or steps may be added to the methods 500 illustrated in FIG. 5A, 600 illustrated in FIG. 6A, and/or or 700 illustrated in FIG. 7A. Similarly, in some embodiments various blocks or steps shown in FIGS. 5A, 6A, and/or 7A may be combined or omitted. Such variations of the methods 500, 600, or 700 are within the scope of this disclosure.

Additionally, certain steps in the processes or process flows described in this specification, including FIG. 5A, 6A, or 7A may naturally precede others for the invention to function in the embodiments as described. However, the disclosure is not limited to the order of the steps described if such order or sequence does not alter the functionality of the invention. Moreover, it is recognized that some steps may performed before, after, or in parallel (substantially simultaneously) with other steps without departing from the scope of the disclosure. Further, words such as "thereafter", "then", "next", "subsequently", etc. are not intended to limit the order of the steps. These words are simply used to guide the reader through the description of the exemplary method.

Figure 5B:
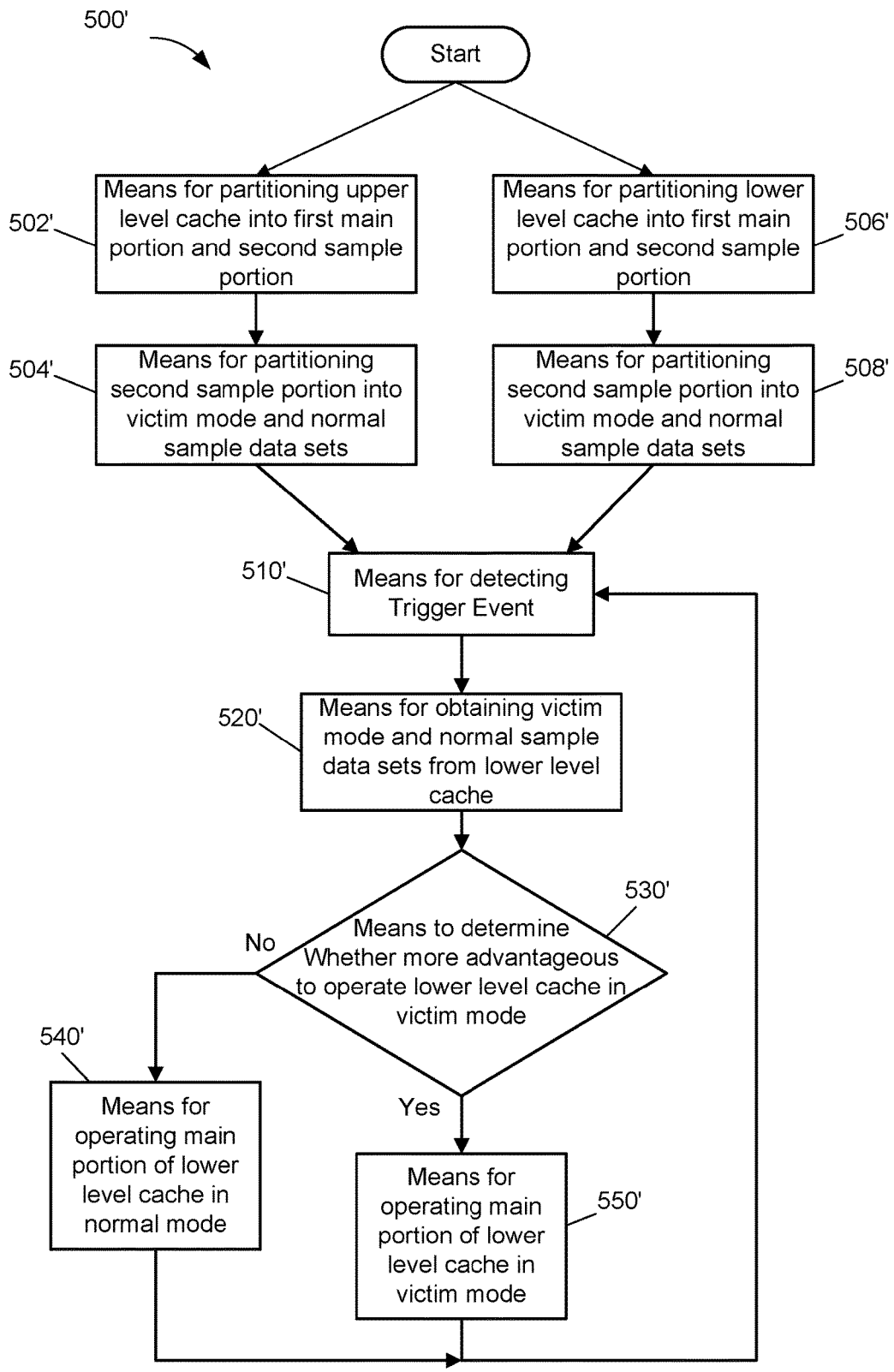
FIG. 5B illustrates example components capable of performing the aspects of the method illustrated in FIG. 5A.
Figure 6B:
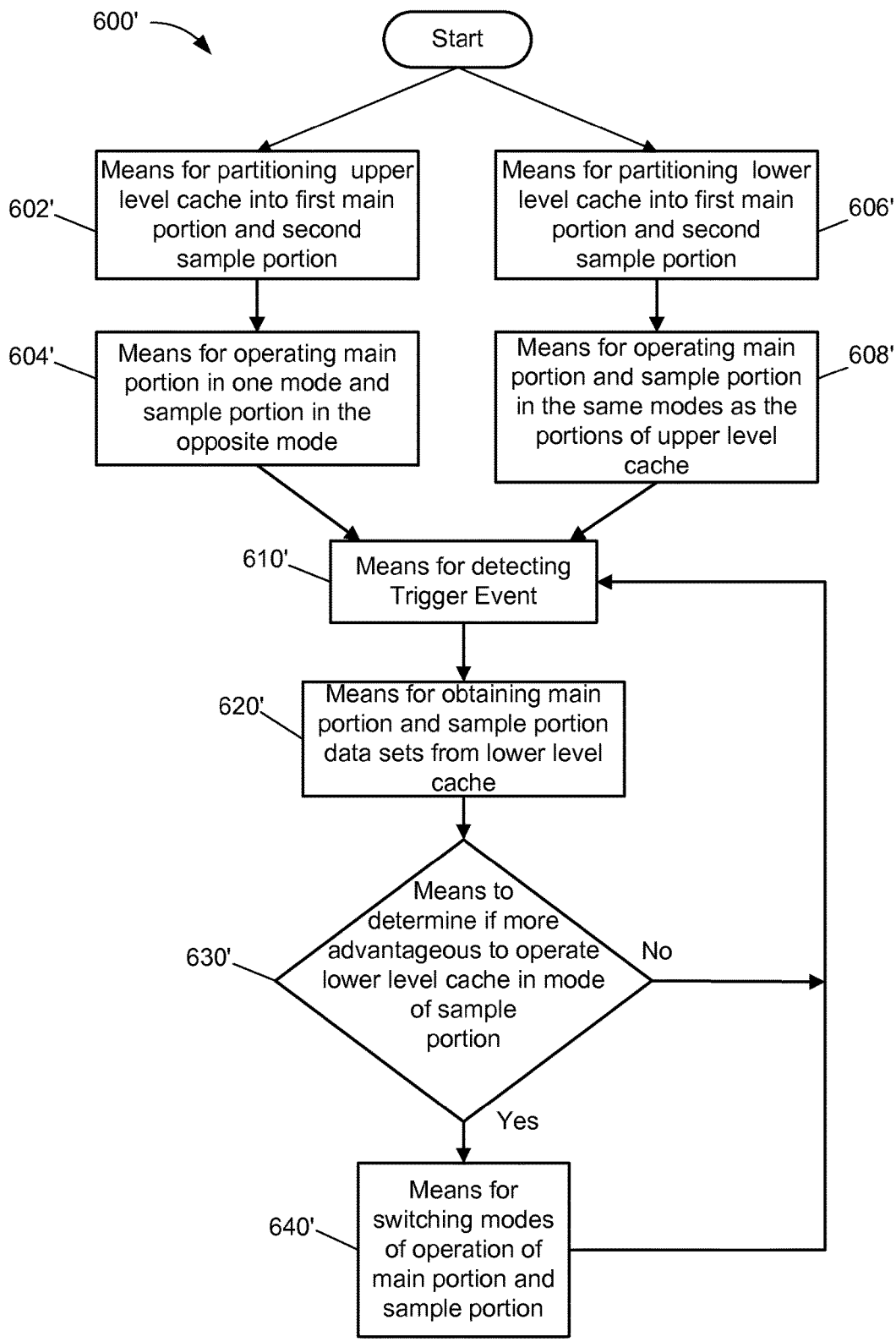
FIG. 6B illustrates example components capable of performing the aspects of the method illustrated in FIG. 6A.
Figure 7B:
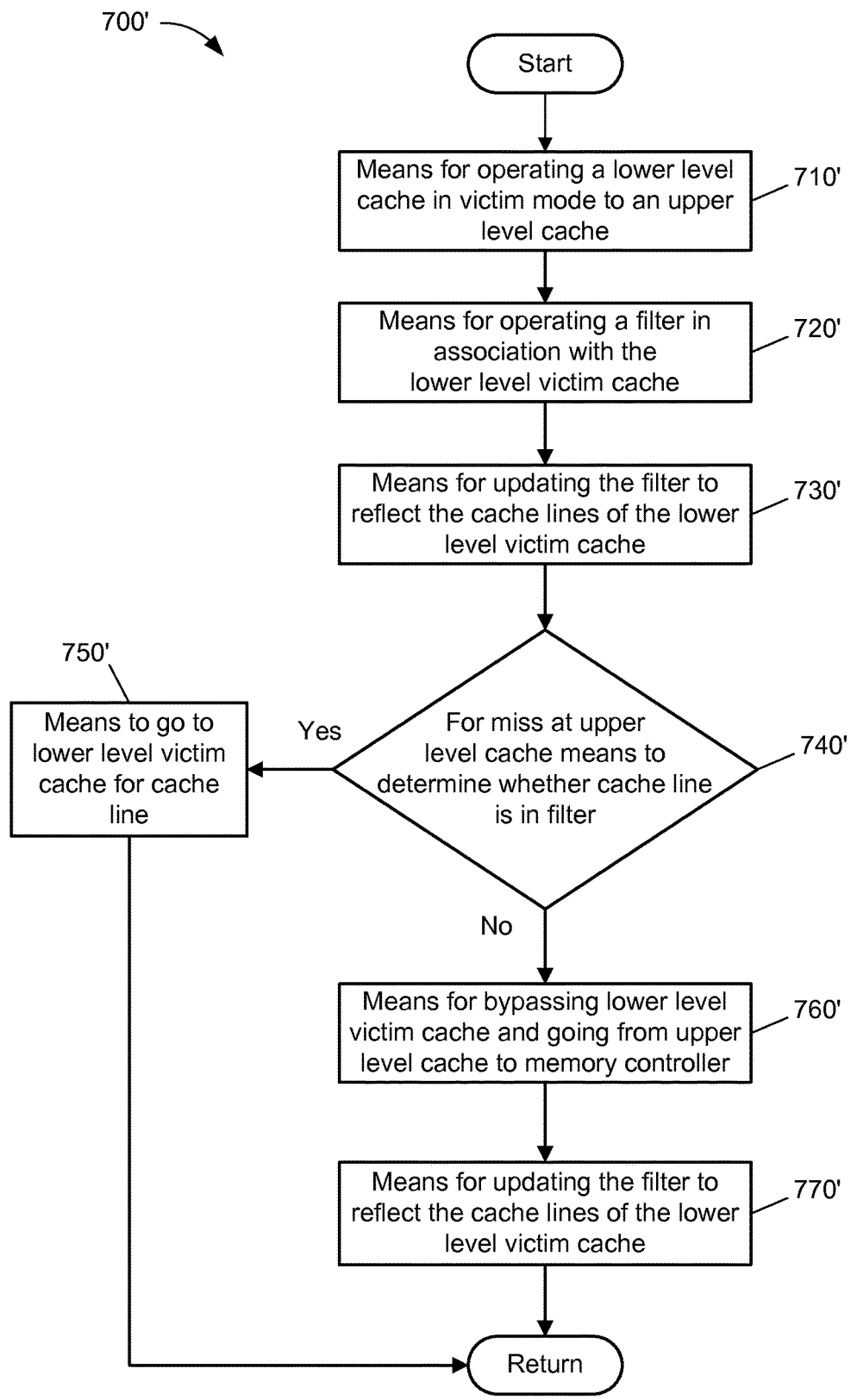
FIG. 7B illustrates example components capable of performing the aspects of the method illustrated in FIG. 7A.

The various operations, methods, or functions described above for methods 500, 600, and 700 may be performed by various hardware and/or software component(s)/module(s). Such component(s) and/or module(s) may provide the means to perform the various described operations, methods, or functions. Generally, where there are methods illustrated in Figures having corresponding counterpart means-plus-function Figures, the operation blocks correspond to means-plus-function blocks with similar numbering. For example, blocks 502-550 illustrated in FIG. 5A correspond to means-plus-function blocks 502'-550' illustrated in FIG. 5B. Similarly, blocks 602-640 illustrated in FIG. 6A correspond to means-plus-function blocks 602'-640' illustrated in FIG. 6B. Finally, blocks 710-770 illustrated in FIG. 7A correspond to means-plus-function blocks 710'-770' illustrated in FIG. 7B.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for improved operation of a victim cache in a portable computing device (PCD), the method comprising:
    operating a lower level cache as a victim to an upper level cache, the lower level cache containing a plurality of cache lines;
    operating a filter in association with the lower level victim cache;
    updating the filter to reflect the plurality of cache lines contained in the lower level victim cache;
    determining whether a requested cache line is one of the plurality of cache lines contained in the lower level cache in the event of a miss at the upper level cache, wherein the determining comprises checking the filter associated with the lower level victim cache; and
    if the determination is that the requested cache line is one of the plurality of cache lines contained in the lower level cache, retrieving the requested cache line from the lower level victim cache,
    if the determination is that the requested cache line is not one of the plurality of cache lines contained in the lower level cache, bypassing the lower level victim cache and requesting the cache line from a memory controller in communication with the upper level cache, wherein the filter is a bloom filter,
    wherein updating the filter to reflect the plurality of cache lines contained in the lower level victim cache further comprises: updating the bloom filter to show that a cache line castout from the upper level cache has been accepted by the lower level victim cache, and
    wherein updating the bloom filter to show that a cache line castout from the upper level cache has been accepted by the lower level victim cache further comprises: issuing an evict without data message when a cache line castout from the lower level cache comprises a clean data cache line.

2. The method of claim 1, wherein:
    the upper level cache comprises an L2 cache associated with a processor, and
    the lower level victim cache comprises an L3 cache in communication with the L2 cache via an interconnect.

3. The method of claim 1, wherein updating the filter to reflect the plurality of cache lines contained in the lower level victim cache further comprises:
    updating the bloom filter to show that an evicted cache line from the lower level victim cache is no longer present in the lower level victim cache.

4. The method of claim 1, wherein the filter is in communication with a point of serialization for the lower level victim cache.

5. The method of claim 4, wherein the point of serialization comprises a portion of the filter.

6. The method of claim 1, wherein bypassing the lower level victim cache and requesting the cache line from a memory controller in communication with the upper level cache further comprises:
    requesting the cache line from a non-cache memory in communication with the memory controller.

7. The method of claim 1, wherein:
    the upper level cache comprises a first L2 cache associated with a processor, and
    the lower level victim cache comprises a second L2 cache in communication with the first L2 cache via an interconnect.

8. A computer system for a system-on-a-chip (SoC) in a portable computing device (PCD), the system comprising:
    an upper level cache;
    a lower level cache in communication with the upper level cache, the lower level cache configured to operate as a victim to the upper level cache, and the lower level containing a plurality of cache lines;
    a filter in communication with the lower level victim cache, wherein the filter is configured to reflect the plurality of cache lines contained in the lower level victim cache; and
    logic configured to:
        determine whether a requested cache line is one of the plurality of cache lines contained in the lower level cache in the event of a miss at the upper level cache by checking the filter associated with the lower level victim cache;
        if the determination is that the requested cache line is one of the plurality of cache lines contained in the lower level cache, causing the requested cache line to be retrieved from the lower level victim cache, and,
        if the determination is that the requested cache line is not one of the plurality of cache lines contained in the lower level cache, bypass the lower level victim cache and request the cache line from a memory controller in communication with the upper level cache, wherein the filter is a bloom filter, and
    wherein the filter configured to reflect the plurality of cache lines contained in the lower level victim cache further comprises: the bloom filter configured to reflect that a cache line castout from the upper level cache has been accepted by the lower level victim cache.

9. The system of claim 8, wherein:
the upper level cache comprises an L2 cache associated with a processor, and
the lower level victim cache comprises an L3 cache in communication with the L2 cache via an interconnect.

10. The system of claim 8, wherein the bloom filter configured to reflect that a cache line castout from the upper level cache has been accepted by the lower level victim cache further comprises:
an evict without data message when a cache line castout from the lower level cache comprises a clean data cache line.

11. The system of claim 8, wherein the filter configured to reflect the plurality of cache lines contained in the lower level victim cache further comprises:
the bloom filter configured to reflect that an evicted cache line from the lower level victim cache is no longer present in the lower level victim cache.

12. The system of claim 8, further comprising a point of serialization in communication with the lower level victim cache.

13. The system of claim 12, wherein the point of serialization comprises a portion of the filter.

14. The system of claim 8, further comprising:
a non-cache memory in communication with the memory controller, and wherein the logic configured to bypass the lower level victim cache and request the cache line from a memory controller in communication with the upper level cache is further configured to request the cache line from the non-cache memory.

15. The system of claim 8, wherein:
the upper level cache comprises a first L2 cache associated with a processor, and
the lower level victim cache comprises a second L2 cache in communication with the first L2 cache via an interconnect.

16. A computer program product comprising a non-transitory computer usable medium having a computer readable program code embodied therein, said computer readable program code adapted to be executed to implement a method for improved operation of a victim cache in a portable computing device (PCD), the method comprising:
operating a lower level cache as a victim to an upper level cache, the lower level cache containing a plurality of cache lines;
operating a filter in association with the lower level victim cache;
updating the filter to reflect the plurality of cache lines contained in the lower level victim cache;
determining whether a requested cache line is one of the plurality of cache lines contained in the lower level cache in the event of a miss at the upper level cache, wherein the determining comprises checking the filter associated with the lower level victim cache; and
if the determination is that the requested cache line is one of the plurality of cache lines contained in the lower level cache, retrieving the requested cache line from the lower level victim cache,
if the determination is that the requested cache line is not one of the plurality of cache lines contained in the lower level cache, bypassing the lower level victim cache and requesting the cache line from a memory controller in communication with the upper level cache, wherein the filter is a bloom filter;
wherein updating the filter to reflect the plurality of cache lines contained in the lower level victim cache further comprises: updating the bloom filter to show that a cache line castout from the upper level cache has been accepted by the lower level victim cache; and
wherein updating the bloom filter to show that a cache line castout from the upper level cache has been accepted by the lower level victim cache further comprises: issuing an evict without data message when a cache line castout from the lower level cache comprises a clean data cache line.

17. The computer program product of claim 16, wherein:
the upper level cache comprises an L2 cache associated with a processor, and
the lower level victim cache comprises an L3 cache in communication with the L2 cache via an interconnect.

18. A computer system for improved operation of a victim cache in a portable computing device (PCD), the system comprising:
means for operating a lower level cache as a victim to an upper level cache, the lower level cache containing a plurality of cache lines;
means for operating a filter in association with the lower level victim cache;
means for updating the filter to reflect the plurality of cache lines contained in the lower level victim cache;
means for determining whether a requested cache line is one of the plurality of cache lines contained in the lower level cache in the event of a miss at the upper level cache, wherein the means for determining comprises means for checking the filter associated with the lower level victim cache; and
means for retrieving the requested cache line from the lower level victim cache if the determination is that the requested cache line is one of the plurality of cache lines contained in the lower level cache, and
means for bypassing the lower level victim cache and requesting the cache line from a memory controller in communication with the upper level cache if the determination is that the requested cache line is not one of the plurality of cache lines contained in the lower level cache, wherein the filter is a bloom filter;
wherein the means for updating the filter to reflect the plurality of cache lines contained in the lower level victim cache further comprises: means for updating the bloom filter to show that a cache line castout from the upper level cache has been accepted by the lower level victim cache; and
wherein the means for updating the bloom filter to show that a cache line castout from the upper level cache has been accepted by the lower level victim cache further comprises: means for issuing an evict without data message when a cache line castout from the lower level cache comprises a clean data cache line.

19. The system of claim 18, wherein:
the upper level cache comprises an L2 cache associated with a processor, and
the lower level victim cache comprises an L3 cache in communication with the L2 cache via an interconnect.

* * * * *